United States Patent [19]
Fushimi et al.

[11] Patent Number: 6,140,761
[45] Date of Patent: Oct. 31, 2000

[54] ELECTRON GENERATION USING A FLUORESCENT ELEMENT AND IMAGE FORMING USING SUCH ELECTRON GENERATION

[75] Inventors: Masahiro Fushimi, Zama; Hideaki Mitsutake, Yokohama; Yoshihisa Sanou, Atsugi, all of Japan

[73] Assignee: Canon Kabushiki Kaisha, Tokyo, Japan

[21] Appl. No.: 09/253,097

[22] Filed: Feb. 22, 1999

Related U.S. Application Data

[62] Division of application No. 08/594,690, Jan. 31, 1996.

[51] Int. Cl.$^7$ ..................................................... H01J 1/62
[52] U.S. Cl. ........................ 313/495; 313/496; 313/497
[58] Field of Search ...................... 313/495, 496, 313/497, 309, 310, 336, 351, 306, 355, 391

[56] References Cited

U.S. PATENT DOCUMENTS

| | | | |
|---|---|---|---|
| 5,066,883 | 11/1991 | Yoshioka et al. | 313/309 |
| 5,445,550 | 8/1995 | Xie et al. | 445/24 |
| 5,530,314 | 6/1996 | Banno et al. | 313/310 |
| 5,594,296 | 1/1997 | Mitsutuke et al. | 313/309 |
| 5,905,335 | 5/1999 | Fushimi et al. | 313/495 |

FOREIGN PATENT DOCUMENTS

| | | |
|---|---|---|
| 0405262 | 1/1991 | European Pat. Off. . |
| 0523702 | 1/1993 | European Pat. Off. . |
| 63-274047 | 11/1988 | Japan . |
| 2257551 | 10/1990 | Japan . |
| WO94 18694 | 8/1994 | WIPO . |

OTHER PUBLICATIONS

Dyke et al., "Field Emission," Advances in Electronics and Electron Physics, vol. 8, pp. 89–185 (1956).

Spindt et al., "Physical Properties of Thin–Film Emission Cathodes with Molybdenum Cones", J. Appl. Phys., vol. 47, pp. 5248–5263 (1976).

Mead, "Operation of Tunnel–Emission Devices," J. Appl. Phys., vol. 32, pp. 646–652 (1961).

Elinson et al., "The Emission of Hot Electrons and the Field Emission of Electrons from Tin Oxide," Radio Eng. and Electronic Physics, vol. 16, pp. 1290–1296 (1965).

Dittmer, "Electrical Conduction and Electron Emission of Discontinuous Thin Films," Thin Solid Films, vol. 9, pp. 317–328 (1972).

Hartwell et al., "Strong Electron Emission From Patterned Tin–Indium Oxide Thin Films," IEEE Trans. ED Conf., pp. 519–521 (1975).

Araki et al., "Electroforming and Electron Emission of Carbon Thin Films," Journal of the Vacuum Society of Japan, vol. 26, pp. 22–29 (1983).

*Primary Examiner*—Vip Patel
*Assistant Examiner*—Todd Reed Hopper
*Attorney, Agent, or Firm*—Fitzpatrick, Cella, Harper & Scinto

[57] ABSTRACT

An image forming apparatus using an electron source which has matrix-wired electron-emitting devices connected with wiring electrodes of conductive material, and a fluorescent member as an image forming member with an accelerating electrode on its inner surface side, opposite to the electron-emitting devices. The wiring electrodes includes a wiring electrode where a semiconductive support member (spacer) is provided via a conductive connection member and a wiring electrode where the semiconductive support member is not provided. The height of the upper surface of the conductive connection member on which the semiconductive support member is provided and that of the upper surface of the wiring electrode where the semiconductive support member is not provided are the same, to prevent shift of electron-beam trajectories around the semiconductive support member, due to disturbance of electric-field distribution.

3 Claims, 29 Drawing Sheets

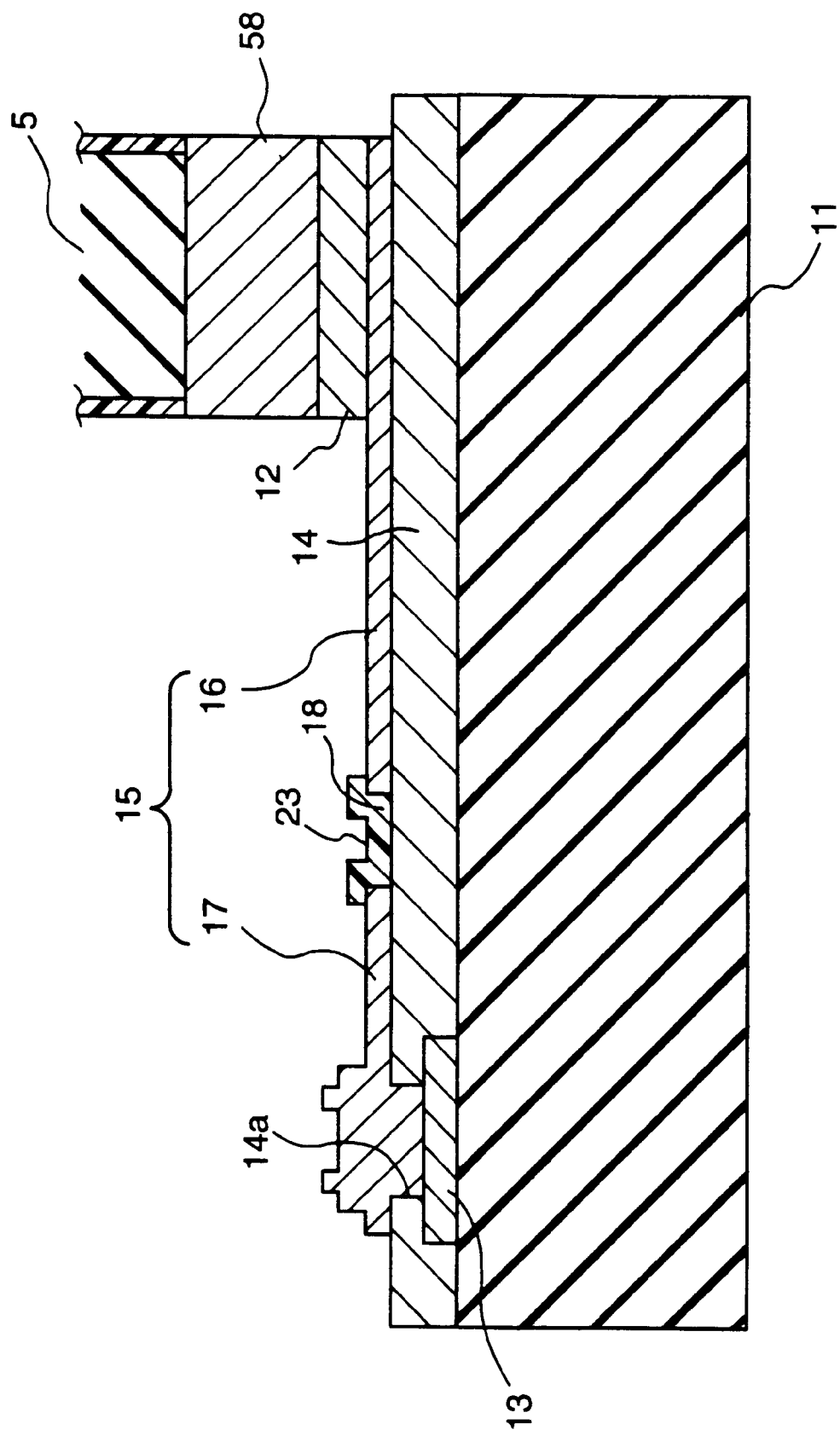

(BLACK STRIPE)

(BLACK MATRIX)

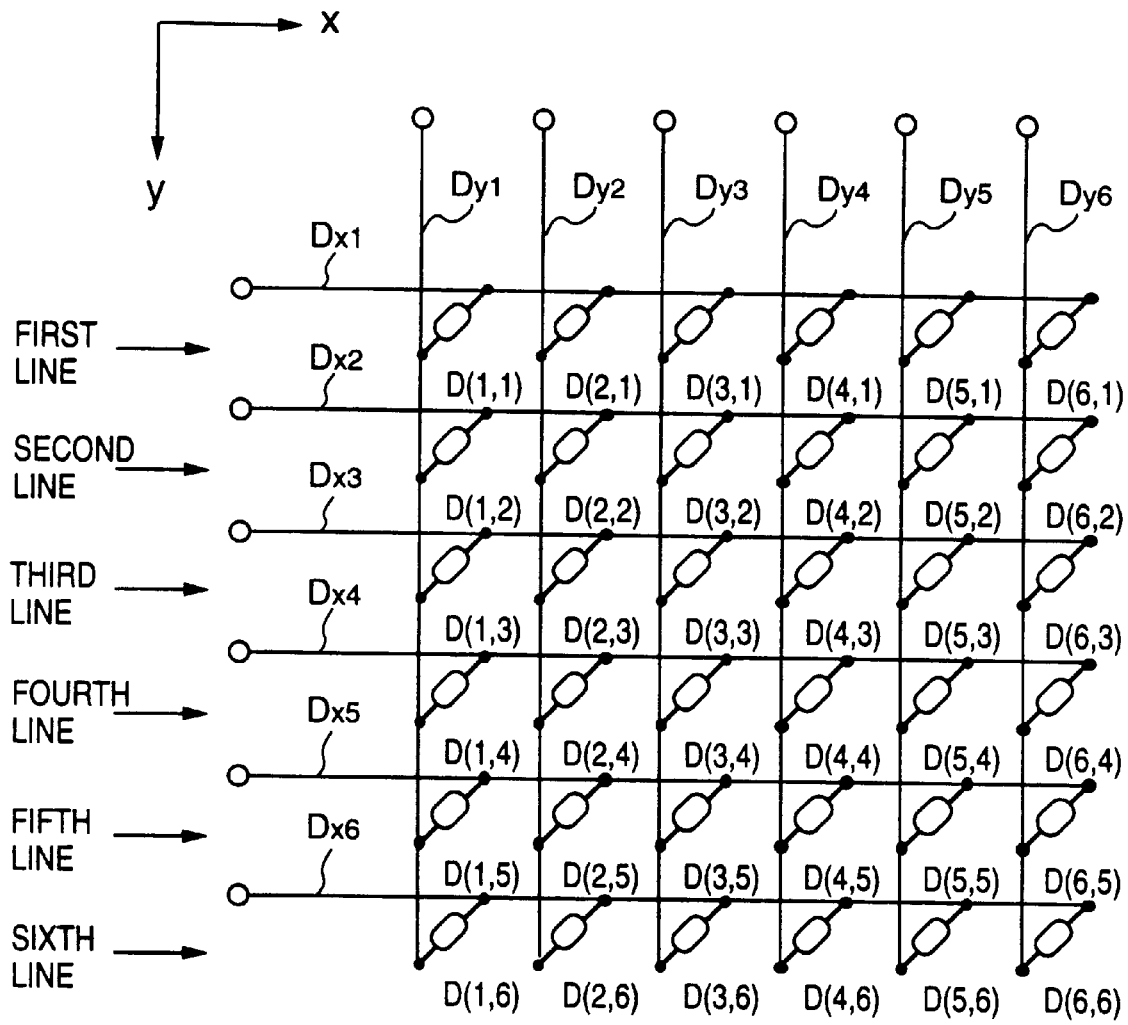
FIG. 16
 SCE TYPE ELECTRON-EMITTING DEVICE

FIG. 17
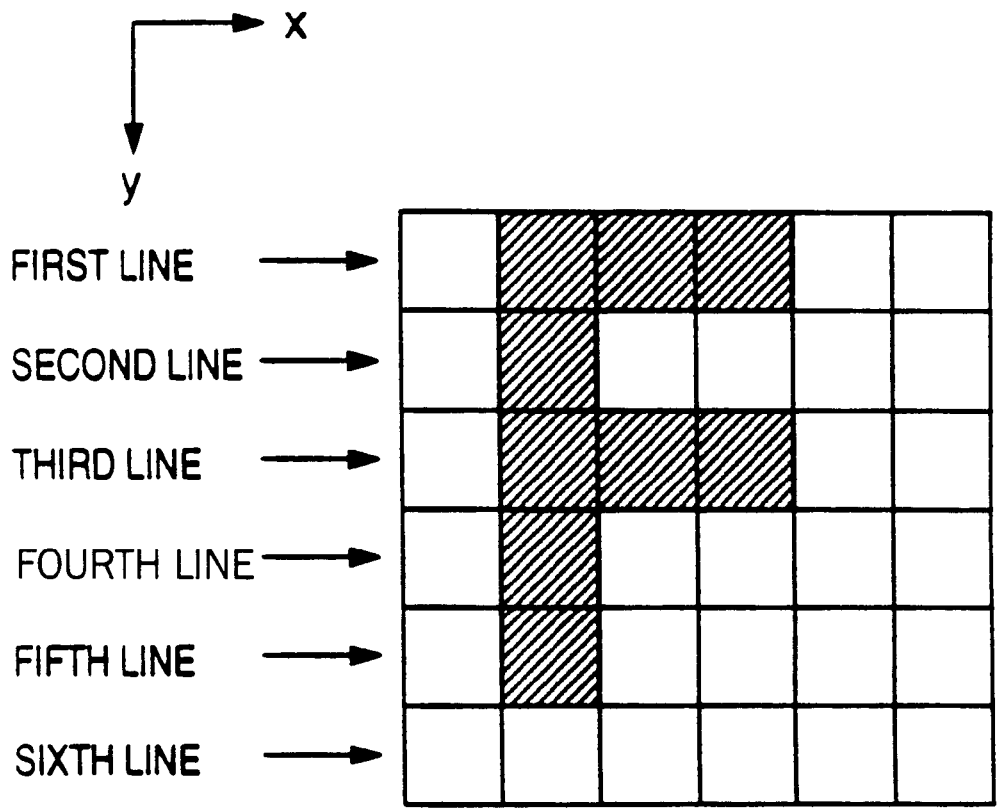
 LIGHT EMITTED
 LIGHT NOT EMITTED $h_1 = h_2$ $h_1 = h_2$

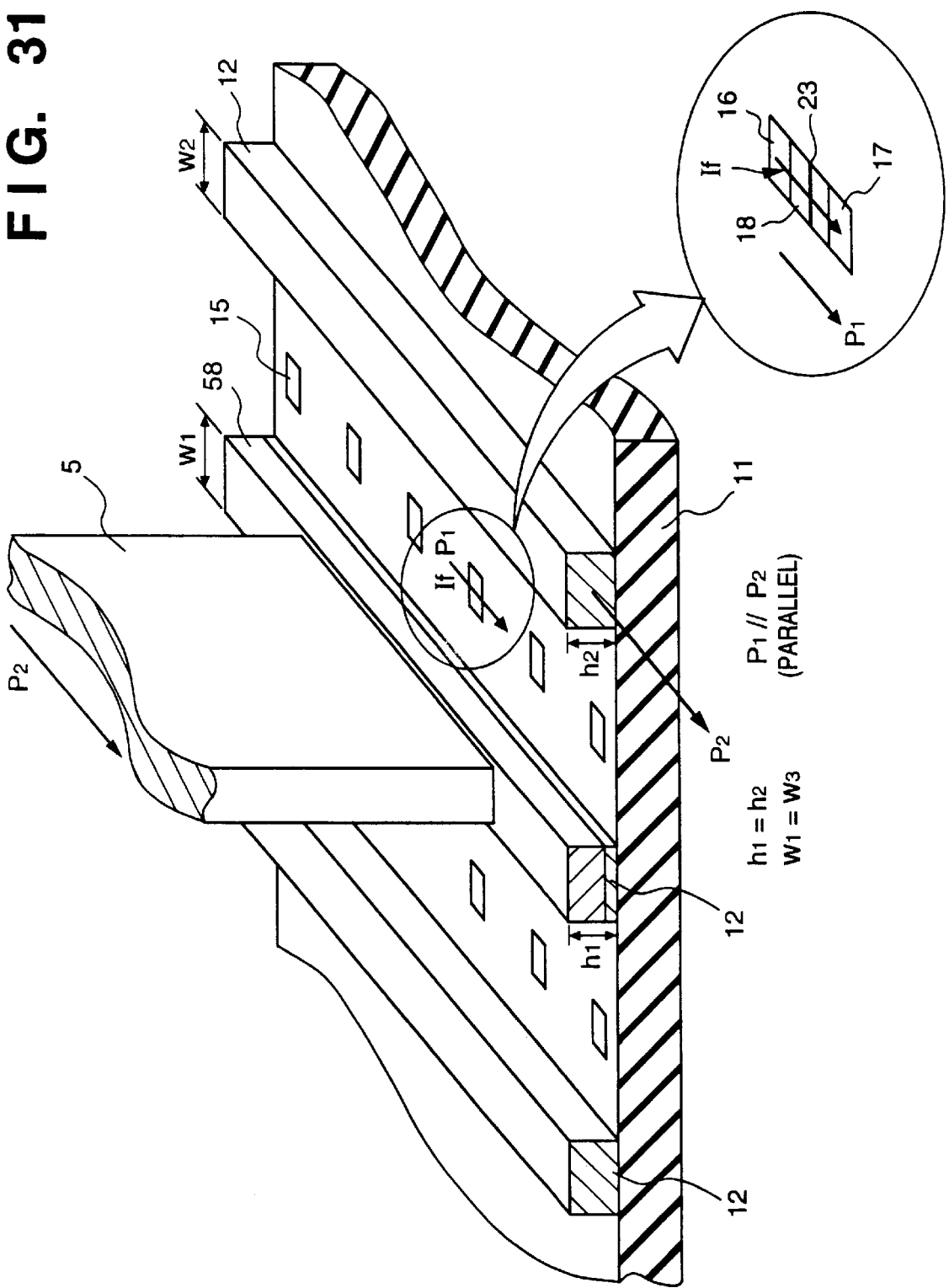

ELECTRON GENERATION USING A FLUORESCENT ELEMENT AND IMAGE FORMING USING SUCH ELECTRON GENERATION

This application is a division of application Ser. No. 08/594,690, filed Jan. 31, 1996.

BACKGROUND OF THE INVENTION

This invention relates to an electron-beam generating apparatus comprising a support member (spacer) and an image forming apparatus such as a display device, to which the electron-beam generating apparatus is applied to and, more particularly to an electron-beam generating apparatus comprising a large number of electron-emitting devices and an image forming apparatus using the electron-beam generating apparatus.

[Description of Related Art]

Generally, an image forming apparatus has an outer casing maintaining vacuum status, an electron source for emitting electrons and its driver, an image forming portion having a fluorescent member which emits light by collision of electrons or the like, an acceleration electrode for accelerating the electrons toward the image forming portion and its high-voltage power source. In an image forming apparatus having a flat outer casing such as a thin-type image display device, a support member (spacer) is employed to obtain atmospheric-pressure-proof structure.

Conventionally, a cold cathode electron-emitting device is known as the electron-emitting device used in an electron source of an image forming apparatus. The cold cathode electron emitting device includes a field emission (hereinafter abbreviated to "FE") type device, a metal/insulating-layer/metal type (hereinafter abbreviated to "MIM") device, or a surface-conduction emission type device.

Known examples of the FE type electron-emitting devices are described by W. P. Dyke and W. W. Dolan, "Field Emission", Advance in Electron Physics, 8, 89 (1956) and by C. A. Spindt, "Physical properties of thin-film field emission cathodes with molybdenum cones", J. Appl. Phys., 47,5248 (1976).

A known example of the MIM type electron-emitting devices is described by C. A. Mead, "Operation of Tunnel-Emission Devices", J. Appl. Phys., 32,646 (1961).

A known example of the surface-conduction emission type electron-emitting devices is described by, e.g., M. I. Elinson, "Radio Eng. Electron Phys., 10, 1290 (1965).

The surface-conduction emission type electron-emitting device utilizes a phenomenon where electron-emission is produced in a small-area thin film formed on a substrate, by passing a current parallel to the film surface. As the surface-conduction emission type electron-emitting devices, electron-emitting devices using an SnO2 thin film according to Elinson mentioned above, an Au thin film according to G. Dittmer ("Thin solid Films", 9,317 (1972)), an In2O3/SnO2 thin film according to M. Hartwell and C. G. Fonstad ("IEEE Trans. ED Conf.", 519 (1975)), a carbon thin film according to Hisashi Araki et al. ("Vacuum", vol. 26, No. 1, p. 22 (1983))are reported.

FIG. 20 shows the structure of the abovementioned device by M. Hartwell and Fonstad as a typical example of these surface-conduction emission type electron-emitting devices. In FIG. 20, numeral 3001 denotes a substrate; and 3002, a conductive thin film comprising a metal oxide thin film formed by sputtering on an H-shaped pattern. An electron-emitting portion 3003 is formed by electrification process referred to as "forming" to be described later.

Conventionally, in these surface-conduction emission type electron-emitting devices, it is general to form the electron-emitting portion by electrification process "forming" on the conductive thin film prior to electron emission. That is, the forming processing is forming the electron-emitting portion with electrically high-resistance by application of a predetermined voltage to the both ends of the conductive thin film to partially destroy or deform the thin film. Note that in FIG. 20, as the electron-emitting portion 3003, the-destroyed or deformed part of the conductive thin film 3002 has a fissure, and electron emission is made around the fissure. Hereinafter, the conductive thin film 3002 including the electrification forming-processed electron-emitting portion 3003 will be referred to as a thin film 3004 including the electron-emitting portion. The electrification forming-processed electron beam emits electrons from the electron-emitting portion 3003 by applying a predetermined voltage to the thin film 3004 and passing a current through the electron-emitting devices.

As an example of the electron source having the surface-conduction emission type electron-emitting devices, Japanese Patent Application Laid-Open No. 64-31332 discloses an electron source having numerous surface-conduction emission type electron-emitting devices, arranged in parallel lines, where both ends of each device are wire-connected.

The combination of the electron source having a plurality of electron beam with a fluorescent member as an image forming member which emits light (visible light) by emitted electrons from the electron source provides various image forming apparatuses. Especially, image display devices (e.g., U.S. Pat. No. 5,066,883 by the present applicant) can be easily applied to a large-display screen devices, and can provide excellent display quality as voluntary light-emitting devices. Accordingly, these image forming apparatuses are expected to take the place of CRT display devices.

For example, in an image forming apparatus as disclosed in Japanese Patent Application Laid-Open NO. 2-257551 by the present applicant, selection of the electron beam is made by application of appropriate drive signals to wiring electrodes (row-direction wiring) connecting parallel arrays of surface-conduction emission type electron-emitting devices, and to wiring electrodes (column-direction wiring) connecting control electrodes arranged between the electron source and the fluorescent member in directions orthogonal to the above wiring directions.

As described above, in the recently proposed image forming apparatuses (flat type CRT's), cold cathode electron-emitting devices have been used for an electron source and support members (spacers) are incorporated for atmospheric-pressure-proof structure, so as to reduce the weight and depth of the apparatus.

However, in such flat type CRT's, disturbance of display image occurs around the support members. The considerable main cause is electric charge-up of the support members which may influence the trajectories of electrons. To prevent the electric charge-up, it has been arranged such that the support members which have conductivity has been considered.

However, the disturbance of display image cannot be fully corrected by merely providing the conductivity to the support members, and the shift of light-emission position, luminance degradation, change of color still occur around the support members.

SUMMARY OF THE INVENTION

The present invention has been made in consideration of the above problems, and has its object to form an image of uniform display status, and especially to provide an image forming apparatus which prevents shift of light-emission position, luminance degradation, change of color, which occur around support members.

According to the present invention, the foregoing object is attained by providing an electron-beam generating apparatus, comprising a plurality of electron-emitting devices, a plurality of row-direction wiring electrodes of conductive material, for applying a predetermined voltage to the electron-emitting devices, an accelerating electrode opposite to the electron-emitting devices, and a semiconductive support member provided between part of the row-direction wiring electrodes and the accelerating electrode, wherein the semiconductive support member is provided on the row-direction wiring electrode via a conductive connection member, and wherein a height of the upper surface of the conductive connection member on the row-direction wiring electrode and a height of the upper surface of conductive material of the row-direction wiring electrode where the semiconductive support member is not provided are substantially the same.

Further, in the electron-beam generating apparatus, wherein the row-direction wiring electrode where the semiconductive support member is provided has a concave portion, and wherein the conductive connection member is arranged in the concave portion, further wherein the height of the upper surface of the conductive connection member on the row-direction wiring electrode and the height of the row-direction wiring electrode where the semiconductive support member is not provided are substantially the same.

Further, in the electron-beam generating apparatus, wherein the row-direction wiring electrode where the semiconductive support member is not provided has a conductive member, and wherein a height of the upper surface of the conductive member and the height of the upper surface of the conductive connection member are substantially the same.

Further, in the electron-beam generating apparatus, wherein a thickness of the row-direction wiring electrode where the semiconductive support member is provided and a thickness of the row-direction wiring electrode where the semiconductive support member is not provided are different, and wherein a height of the upper surface of the conductive connection member on the row-direction wiring electrode and a height of the row-direction wiring electrode where the semiconductive support member is not provided are substantially the same.

Further, the foregoing object is attained by providing an electron-beam generating apparatus, comprising a plurality of electron-emitting devices, a plurality of row-direction wiring electrodes of conductive material, for applying a predetermined voltage to the electron-emitting devices, an accelerating electrode opposite to the electron-emitting devices, and a semiconductive support members provided between part of the row-direction wiring electrodes and the accelerating electrode, wherein the semiconductive support member is provided on the row-direction wiring electrode via a conductive connection member, and wherein if predetermined electric potentials of the same level are applied to the row-direction wiring electrode where the semiconductive support member is provided and the row-direction wiring electrode where the semiconductive support member is not provided, a thickness of conductive connection member is controlled such that electric-potential distribution on a surface of the semiconductive support member and that in space between the row-direction wiring electrode where the semiconductive support member is not provided and the accelerating electrode become the same.

In accordance with the present invention as described above, in a case where the support member(s) (spacer(s)) is an insulating member, the support member has a semiconductive film on its surface. This is made to prevent the above-described electric charge-up. The apparatus has a function to neutralize electric charge by passing a weak current in the semiconductive film. Note that the support member(s) (spacer(s)) may be a semiconductive member. In this case, the current that flows the surface area of the support member contributes to the prevention of electric discharge. For this reason, in a case where the support member(s) (spacer) is a semiconductive member, there is no need to have a semiconductive film on its surface.

In maintaining the support member (spacer), a conductive connection member is inserted between the spacer and the wiring electrodes for electrical connection between the semiconductive film of the insulating member surface or the semiconductive support member and wiring electrodes. This is made to prevent the electric charge-up by passing a weak current on the surface of the spacer. However, if the conductive connection member between the wiring electrodes and the spacer are thick, a slope of electric potential is generated around these members. This causes shifting of the trajectories of electrons emitted from the electron-emitting devices.

In consideration of the above problem, the construction as described above is proposed.

According to the present invention, the electron-beam generating apparatus is not only applicable to an image forming apparatus preferable as a display device but to other devices. For example, in an optical printer that comprises an electrostatic drum, light-emitting diode and the like, the electron-beam generating apparatus is used as a light-emitting source substituting for the light-emitting diode. In this case, the substitute light-emitting source may be two-dimensional light-emitting source as well as a line-type light-emitting source.

Further, according to the present invention, the present invention is applicable to other devices than the image forming apparatus and the electron-beam generating apparatus. For example, the present invention can be applied to an apparatus utilizing electrons emitted from an electron source, such as an electron microscope.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a cross-sectional view cut out along a line B–B' in FIG. 3, showing the structure of the electron source 1;

FIG. 16 is an example of a matrix wiring arrangement of the electron-emitting devices of the image forming apparatus of the embodiment;

FIG. 17 is a sample image for image formation according to the embodiment;

FIG. 31 is a perspective view showing the conductive connection member according to another example of the fourth embodiment.

DETAILED DESCRIPTION OF THE PREFERRED EMBODIMENTS

Preferred embodiments of the present invention will now be described in detail, after explanation of general concept of the present invention in accordance with FIGS. 1, 11, 12, 13 and 24.

Figure 1:
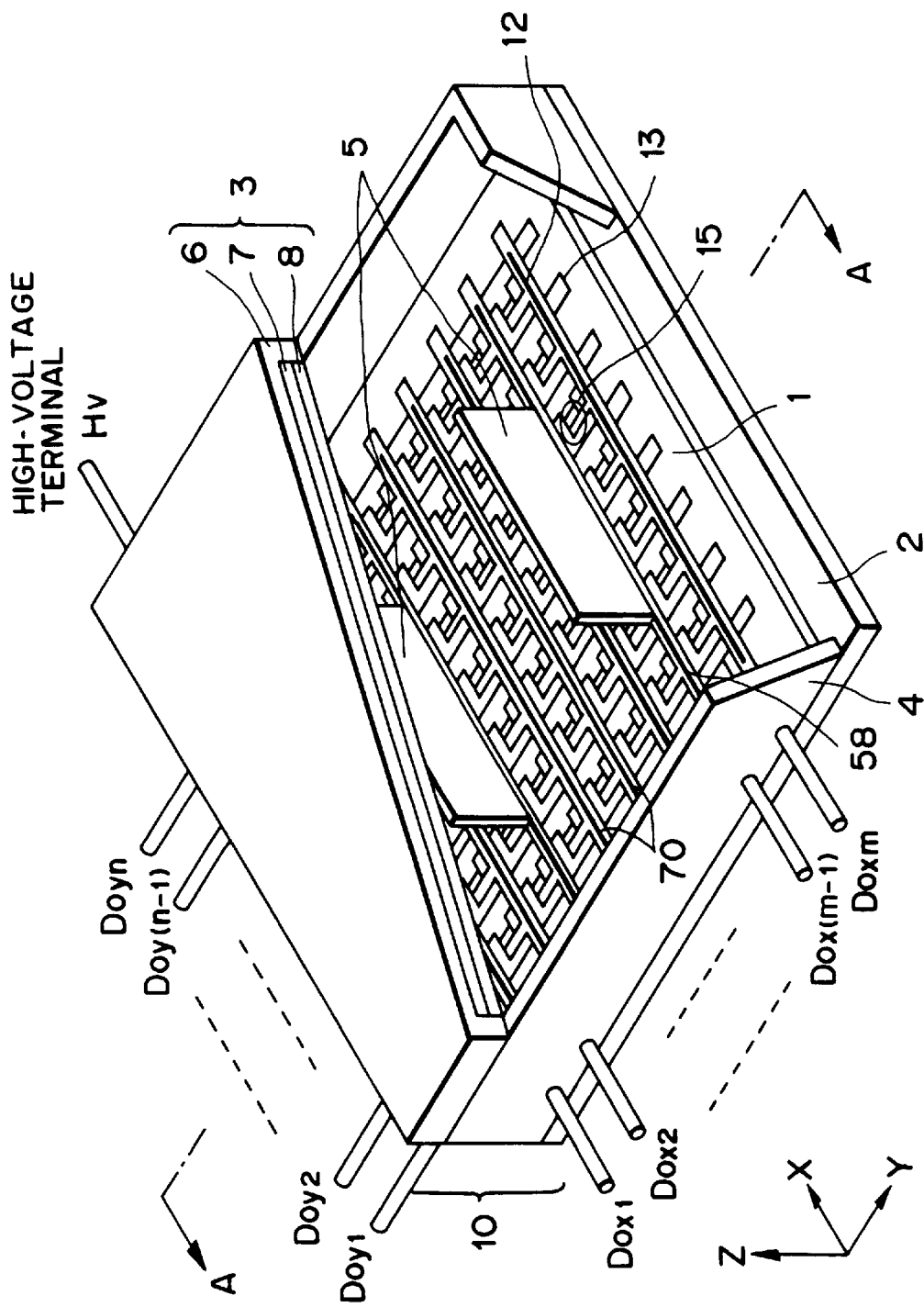
FIG. 1 is a partially cut-away perspective view showing the structure of an image forming apparatus according to an embodiment of the present invention.

In FIG. 1, reference numeral 1 denotes an electron source; 2, a rear plate; 3, a face plate; 4, a support frame; 5, a spacer; 6, a glass substrate; 7, a fluorescent film; 8, a metal back; 10, an outer casing; 12, row-direction wiring electrodes; 13, column-direction wiring electrodes; 15, electron-emitting devices; 58, conductive connection member; and 70, conductive members.

(a) Trajectories of Emitted Electrons

Figure 11:
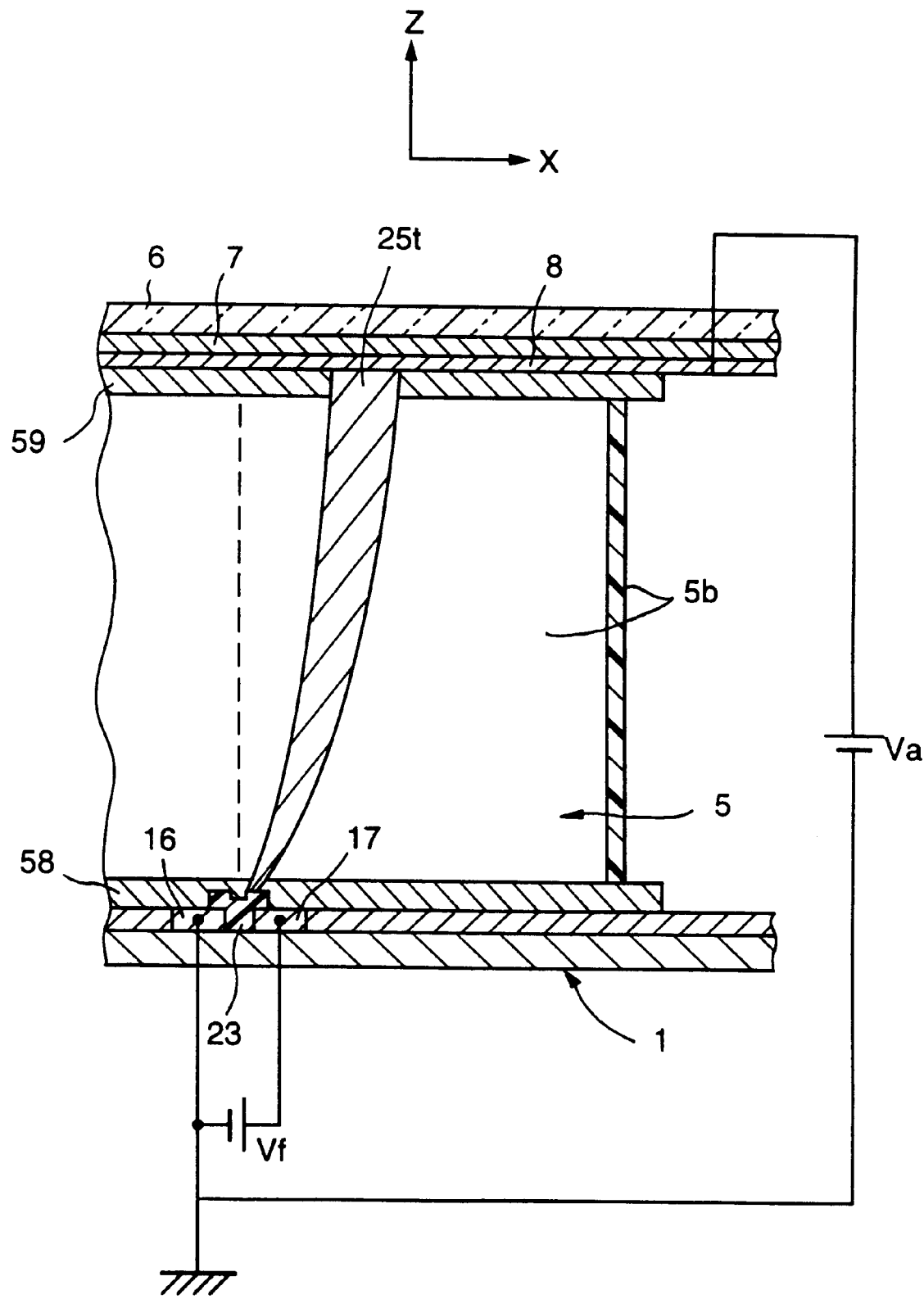
FIG. 11 is a cross-sectional view showing electron emission and scattered particles in the image forming apparatus of the embodiment, viewed from a column direction.

In FIG. 1, when a predetermined voltage Vf is applied to the plurality of electron-emitting devices 15 via external terminals Dox1 to Doxm, Doy1 to Doyn of the outer casing 10, the devices emit electrons from an electron-emitting portion 23 (FIG. 11). At the same time, a predetermined high voltage of several kV is applied to the metal back 8 (or to unshown transparent electrode) via a high-voltage terminal Hv, to accelerate the electrons emitted by the electron-emitting portion 23, and to collide with the electrons to the inner surface of the face plate 3. This excites a fluorescent member of the fluorescent film 7, which emits light, thus an image can be displayed.

Figure 12:
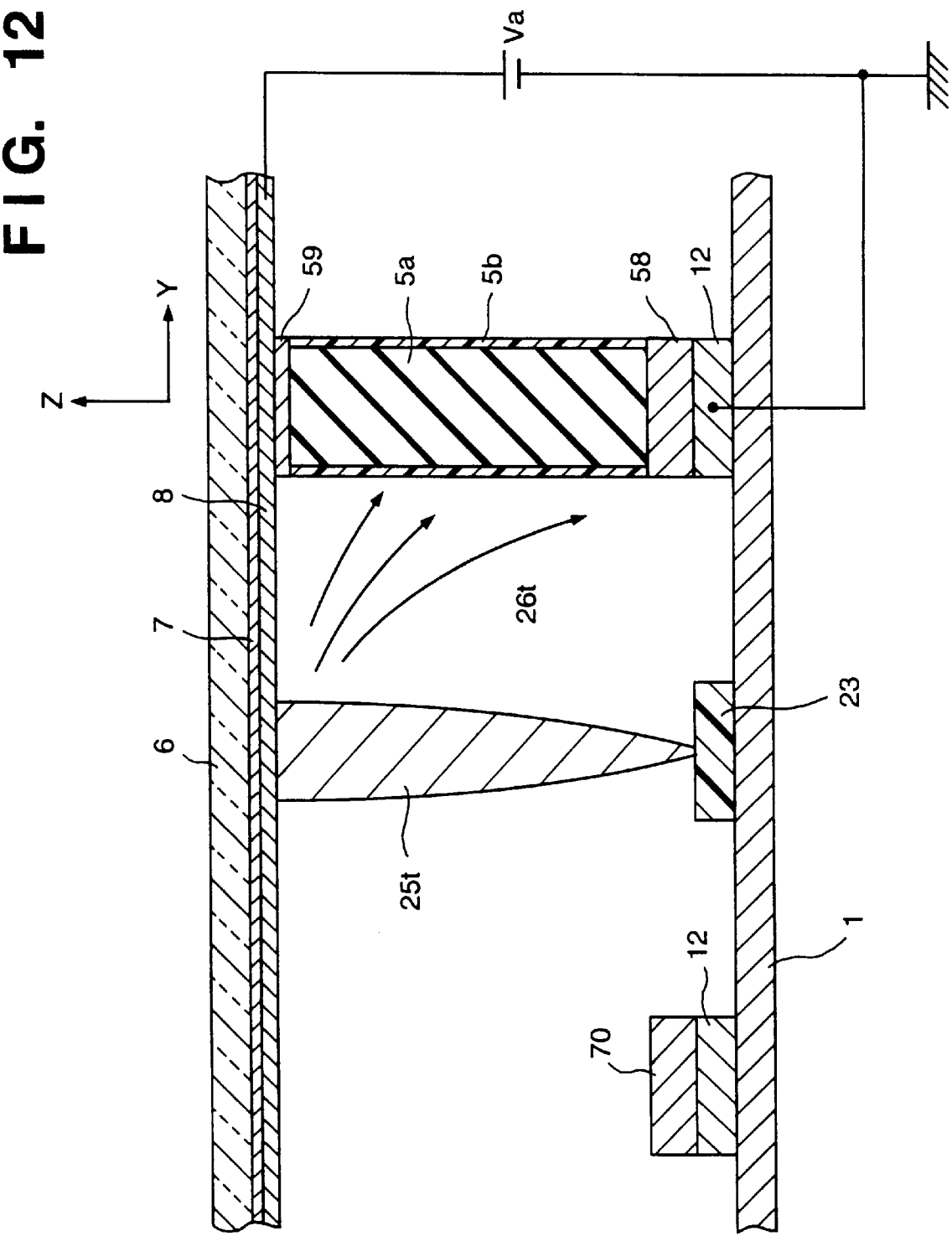
FIG. 12 is a cross-sectional view showing the occurrence of the electron emission and the scattered particles in the image forming apparatus of the embodiment, viewed from a low direction.

FIGS. 11 and 12 show the electron emission as described above and occurrence of scattered particles to be described later. FIG. 11 is viewed from a direction Y, and FIG. 12, from a direction X in FIG. 1. In FIG. 11, the electrons, emitted from the electron-emitting portion 23 by application of the voltage Vf, traverse a parabola trajectory 25t shifted toward a device electrode 17 on a high-voltage side, away from a normal line (presented by a broken line) from the electron-emitting portion 23 to the surface of the face plate 3. For the movement, the central light-emitting position of the fluorescent film 7 is shifted from the normal line. It is considered asymmetric electric potential distribution within a plane parallel to an electron source 1 with respect to the normal line is the main factor of this emission characteristic.

(b) Shift of Electron Trajectories

As described above, in a study of the image forming apparatus using an electron source having a plurality of matrix-arranged surface-conduction emission type electron-emitting devices, the present inventors have found that the light-emitting position of the fluorescent film and the form of the light emission may be shifted from the designed values. Especially when a color image forming device is used, luminance degradation and color shift in addition to the shift of light-emitting position have been observed. Further, it is confirmed that the shift of light-emitting position occurs near a support member (spacer) provided between the electron source and the image forming member or peripheral portion(s) of the image forming member.

In the present invention, the above problem that occurs near the support member (spacer) is solved.

The trajectories of the electrons near a spacer 5 are considered as follows.

In addition to light-emission by the fluorescent film 7 due to collision of the electrons emitted from the electron source 1 with the inner surface of the face plate 3, scattered particles (ions, secondary electrons, neutral particles etc.) are generated with a certain probability, due to the collision of the electrons with the fluorescent film 7, and with lower probability, collision of the electrons with residual gas in vacuum atmosphere. In the example of FIG. 12, the scattered particles traverse the trajectories 26*t* in the outer casing 10.

The present inventors have found that the light-emitting positions (electron-collision position) on the fluorescent film 7 near the spacer 5 and the form of light-emission are shifted from designed values. Especially in a case where a color image forming device is employed, luminance degradation and color shift as well as the shift of the light-emitting positions have been observed.

It is considered that the main cause of this phenomenon is collision of a part of the above-described scattered particles against an exposed part of an insulating member 5*a* of the spacer 5, resulting in electric charge-up of the exposed part. The electric field around the electrically-charged exposed part changes, which causes shift of electron trajectories, then shifts the light-emitting position of the fluorescent member and changes the light-emission form.

Further, it is found, from the shift of light-emitting position of the fluorescent member and the change of light-emission form, that the above exposed part carries with mainly positive electric charge. It is considered that attachment of positive ions among the scattered particles to the exposed part or positive electric charge by emission of the secondary electrons generated upon collision of the scattered particles with the exposed part are possible causes of the positive electric charge-up.

(C) Prevention of Shift of Electron Trajectories

To prevent the above-described positive electric charge, the present inventors applied a semiconductive film onto the surface of the spacer 5, thus neutralized the positive electric charge. At this time, to form an electric path between the semiconductive film, the electron source and the face plate, a conductive connection member 58 and 59 were provided.

However, the image forming apparatus has wiring electrodes connected to the support member (spacer) via the conductive connection member 58 and wiring electrodes not connected to the support member (spacer), the regularity of electric field is distorted due to the conductive connection member 58. To keep the regularity of electric field in the image forming apparatus of this invention having the wiring electrodes connected to the support member via the conductive connection member and also having the wiring electrodes without the support member, the shift of electron-beams near the spacer can be prevented, by setting the height of the upper surface of the conductive connection member connected to the support member and that of the upper conductive surface of the wiring electrodes where the support member is not provided to the same height.

The effect of this arrangement will be described with reference to FIGS. 24A to 24D showing electric-potential distribution represented by equipotent lines, as results of electric-field simulation.

In FIGS. 24A to 24D, numeral 25 denotes emitted electrons; 60, equipotential lines; and 23, electron-emitting portion of electron emitting device.

Figure 24A:
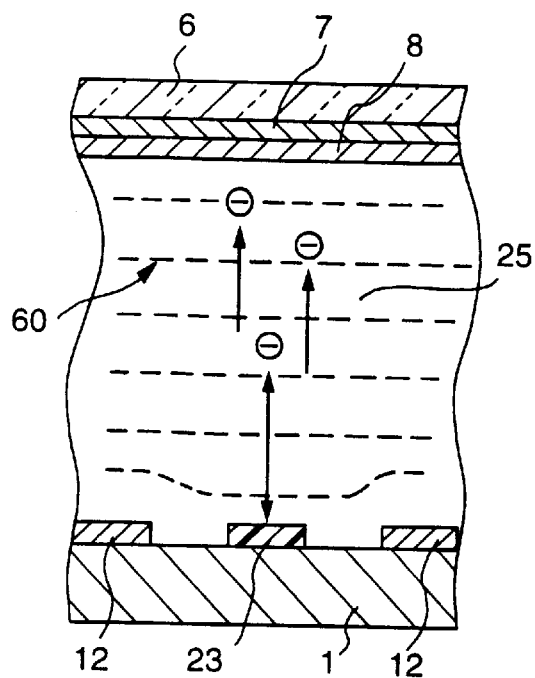
FIGS. 24A to 24D is explanatory views showing a cause of shifting of electron-beam trajectories from the electron-emitting devices and improved electron-beam trajectories.

FIG. 24A shows a case where the spacer 5 is not provided. When the accelerating voltage is applied to the metal back 8, the equipotent line 60 has balanced shape respectively at both side of the electron-emitting portions. When electrons are emitted from the electron-emitting devices, the electrons move in a direction toward the acceleration electrode (toward fluorescent film) in accordance with the electric field, however, the electron trajectories are not bent toward one row-direction wiring as described later.

Figure 24B:
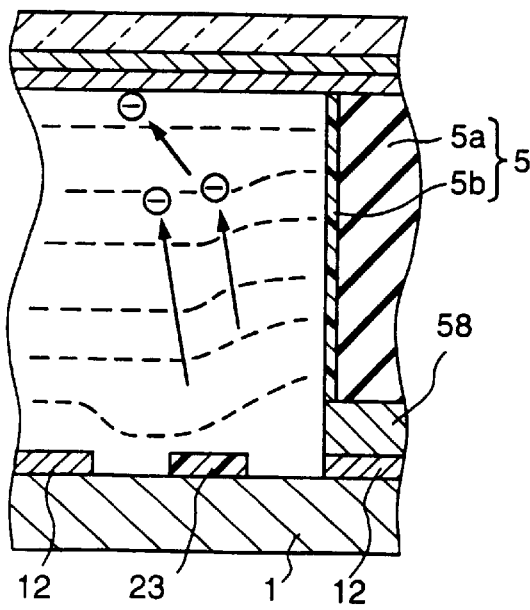

FIG. 24B shows a case where the present invention is not applied, and the conductive connection member 58 is formed on the row-direction wiring electrode 12 to hold the spacer 5, with in electrical contact with the spacer 5. However, around the spacer 5 having the conductive connection member 58, the potential of the conductive connection member 58 is substantially equal to that of the row-direction wiring electrode 12. The equipotent lines are distorted as shown in FIG. 24B, and the balance between the right and left portion of the electron-emitting portion 23 is lost. This distorts the equipotent lines, as shown in FIG. 24B, and thus shifts the electron-beam.

Figure 24C:
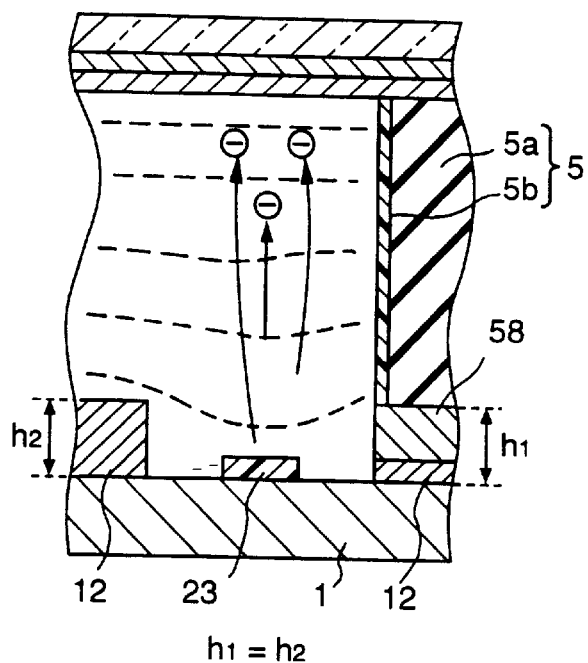
Figure 24D:
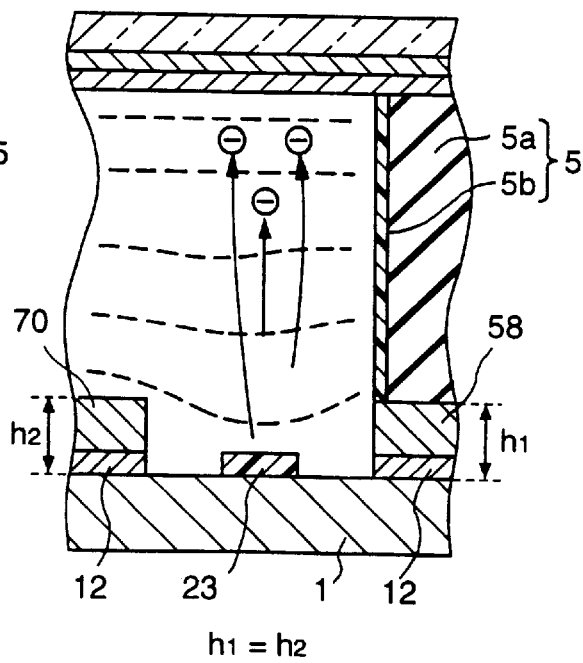

FIG. 24C and 24D show cases where the present invention is applied. In FIG. 24C, the height of one wiring electrodes 12 is equal to that of the conductive connection member 58 mounted on another wiring electrode 12. In FIG. 24D, the conductive connection member 58 is mounted one wiring electrode, and the conductive member 70 is mounted on the other wiring electrode, so that the heights of these neighboring conductive portions are the same. As it is understood from FIGS. 24C to 24D, setting the height of a wiring electrode on which a conductive connection member is provided and that of a wiring electrode on which no conductive connection member is provided to the same height forms symmetrical electric-potential distribution in the right and left portions of the electron-emitting portion 23, thus moves the emitted electrons 25 in a desired direction (toward the fluorescent film 7). That is, in FIG. 24D, the conductive member 70 is formed on the row-direction wiring electrode 12 where the spacer is not arranged so that the height of the conductive member 70 is equal to that of the conductive connection member 58 provided on the other wiring electrode 12 and the electric-field distribution around the electron-emitting portion 23 becomes symmetri. This construction of the present invention prevents the shift of the electron-beam trajectories around the spacer 5 due to a slope of the electric-field around the electron-emitting portion 23.

In this manner, the shift of electron-beam trajectories around the spacer can be prevented by effectively utilizing conductive material.

To neutralize electric charge by passing a weak current through a semiconductive member, it is necessary to make electrical connection of the semiconductive portion of the spacer with the electrodes of a device base plate (or wiring portion). Further, in thin-type image forming apparatuses, it is necessary to firmly hold the support members (spacers) used to maintain atmospheric-pressure-proof structure, as constituting members.

Next, materials of conductive connection member to firmly hold the support member (spacer) and make electrical connection with the spacer will be described.

For the purpose of firmly holding the support members (spacers), bonding material is used, and for the electrical connection, conductive filler is used. In the present invention, the bonding material where the conductive filler is scattered is used as conductive connection member. Hereinbelow, the bonding material and the conductive filler will be described.

Using low-fusing-point glass (flit glass), as the bonding material, heat-melt bonding is made at about 400 to 500° C. The flit glass includes crystalline and non-crystalline type structures and further includes various types having different components. An appropriate type of flit glass may be selected in accordance with a heat-melt temperature and/or thermal-expansion coefficient of material. As flit glass unit material is a powdery material, for application of the bonding material, the flit glass powder is mixed with an organic solvent, or an organic solvent as a mixture of clay with a binder such as nitrocellulose or acrylic material, into a paste of flit-glass mixture. In consideration of working condition for the bonding operation, the flit-glass paste at a room temperature and with viscosity is used.

As another material of the conductive connection member, a conductive filler is obtained by forming a metal film by plating a ball of soda-lime glass or silica with a 5 to 50 $\mu$m diameter.

Then, the conductive connection member is formed by applying flit-glass paste, obtained by mixing the above-mentioned flit-glass paste with the conductive filler, to an attachment portion by a screen printing method or by using a dispenser and then sintering the applied paste.

One example of manufacturing the conductive connection member using non-crystalline flit glass (LS-3081 by Nippon Electric Glass Co. Ltd.) and gold-plated soda-lime glass as the conductive filler will be described.

In this example, soda-lime glass balls having an average 30 $\mu$m diameter are employed as the conductive filler. The conductive layer of the filler is formed by sequentially piling a 0.1 $\mu$m Ni film as a base, then a 0.05 $\mu$m Au film over the base Ni film, in accordance with an electroless plating method. Then, flit-glass paste is obtained by mixing the conductive filler with the flit-glass powder, and further mixed with a binder as described below.

(1) Process of Manufacturing of Conductive Flit-Glass Paste, and Application and Drying of Paste The conductive filler is mixed by 30 wt % with respect to the flit-glass powder, then mixed with a binder where acrylic resin is melted in solvent into paste (conductive flit-glass paste). After the paste is applied to the attachment portion, it is dried at 120° C. for 10 to 20 minutes.

In a conventional flit-glass paste application method, a dispenser robot as a combination of a dispenser which discharges flit-glass paste from a needle, with a robot capable of three-dimensional movement with high-speed and high-precision between a paste-discharge portion to an applied member is employed. An dispenser robot can be used for application of the flit-glass paste of the present embodiment. The dispenser robot is widely used for industrial purposes, as an application device for various paste materials such as soldering paste.

(2) Temporary Sintering Process

To remove the binder in the conductive flit-glass paste, temporary sintering process is performed such that the maximum sintering temperature is 320° C. to 380° C. at which the binder decomposes. By this process, the conductive flit-glass paste has sintered at its surface.

(3) Sintering Process

The conductive flit-glass paste is heated such that the maximum temperature becomes 410° C. corresponding to a melting temperature. By this process, the conductive flit-glass paste is melt-broken down and solidified by cooling, thus fixing is completed. The heat-application requires two heating steps.

Note that in the present construction, it is preferable that the following relation can be held:

Spacer's resistance>>Conductive connection member's resistance≈Wiring electrode's resistance Preferably, the spacer's resistance value is held to be $10^4$ or greater (spacer-surface resistance). On the other hand, the respective resistance values of the conductive connection member and the wiring electrodes are preferably 2 orders less of magnitude, or more preferably 4 orders less of magnitude than the spacer resistance value. Further, the difference between the resistances of the conductive connection member and the wiring electrodes can be ignored when the respective differences of the resistance values between the wiring electrodes with respect to the spacer reside within the above-mentioned range. A large difference between the conductive connection member's resistance value and the wiring electrodes' resistance values may cause disturbance of the electric field, however, a large difference between the spacer resistance value and the resistance values of other portions effects the electron trajectories around the wiring electrodes and the conductive connection member, at an ignorable level. However, to reduce the effect, the resistance difference should preferably be less than two orders of magnitude.

[General Embodiment]

Next, the image forming apparatus to which the general embodiment is applied will be described. The image forming apparatus basically comprises, within a thin-type vacuum container, a multi electron source having a plurality of cold cathode electron-emitting devices arranged on a base plate, and an image forming member, opposite to the electron source, which forms images by irradiation from the electron source.

The cold cathode electron-emitting devices can be formed by precisely aligning the devices on a base plate using, e.g., a photolithography etching technique. Therefore, a large number of electron-emitting devices can be arranged at minute intervals. In addition, in comparison with the thermal cathode electron-emitting devices, employed in conventional CRT's or the like, the cathode itself and its peripheral portion can be driven at a comparatively low temperature, which enables it easily to realizes a multi electron source of further minute device pitch.

The most preferable cold cathode electron-emitting device is the aforementioned surface-conduction emission type electron-emitting device. That is, in the MIM type electron-emitting device, its insulating layer and that of the upper electrode must respectively have a comparatively-precise predetermined thickness. Also, in the FE type electron-emitting device, precise formation of the distal end of its electron-emitting portion is required. For these reasons, these two types of devices raise manufacturing costs or cause difficulties in forming a large-screened image forming apparatus due to limitations of manufacturing processes.

In contrast, the surface-conduction emission type electron-emitting device has a simple structure and can be easily manufactured, thus enables formation of a large-screened image forming apparatus. Recent situation where large-screened and low-price display devices are needed, surface-conduction emission type electron-emitting devices are the most preferable cold cathode electron-emitting devices.

The present inventors have found that among the surface-conduction emission type electron-emitting devices, a device where the electron-emitting portion or its peripheral portion is formed using fine-particle film is preferable from the point of electron-emission characteristic or the point of large-screened image forming apparatus.

Accordingly, in the following the first embodiment of the present invention, an image display device using a multi electron source having the surface-conduction emission type electron-emitting devices formed using a fine-particle film, is used as a preferable example of the image forming apparatus of the present invention.

Note that in the following embodiments, the regularly arranged wiring electrodes partially connected to the support members are referred to as the "row-direction wiring electrodes". However, this name is made for the purpose of convenience of explanation, and it may also be replaced with the column-direction wiring electrodes, without causing any problem from the point of the present invention.

<First Embodiment>

Figure 2:
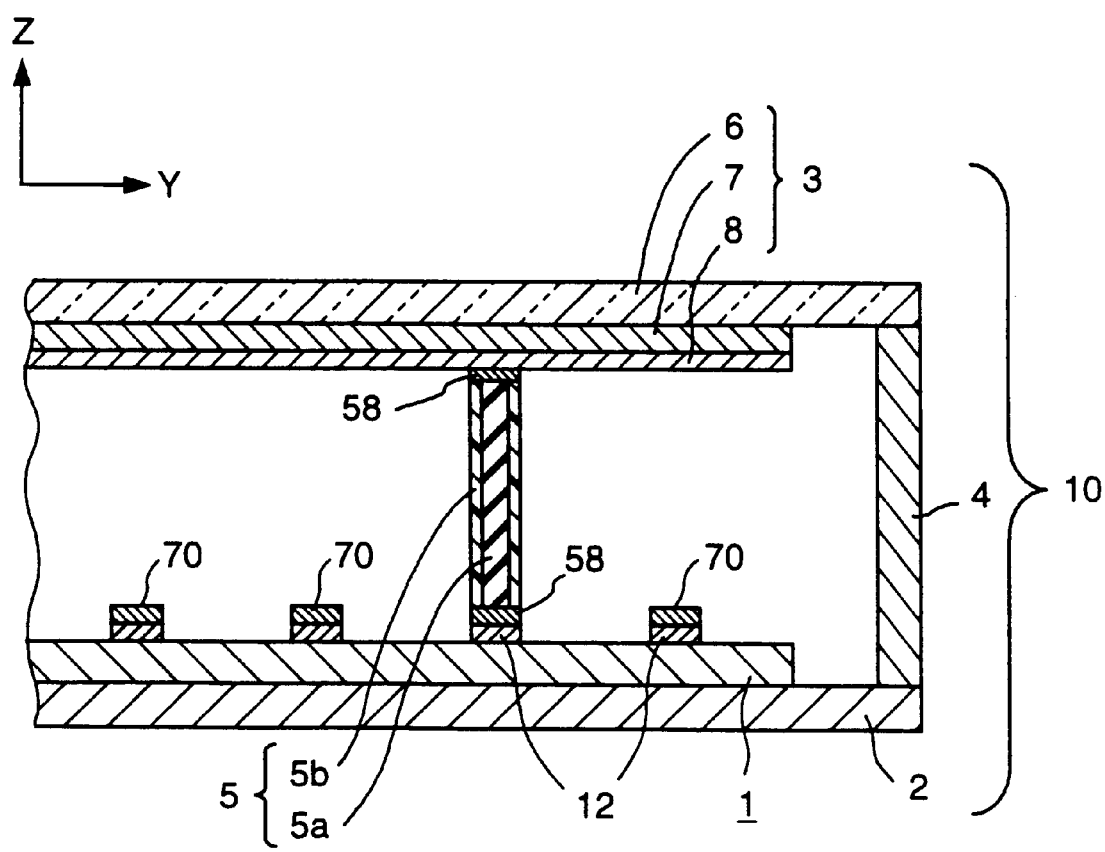
FIG. 2 is a cross-sectional view showing the structure of a spacer provided in the image forming apparatus of the embodiment.

FIG. 1 is a partially-cutaway perspective view showing the structure of the image forming apparatus, and FIG. 2, a cross-sectional view of a significant part of the image forming apparatus in FIG. 1 cut along the line A–A'.

In FIGS. 1 and 2, the electron source 1 where the plurality of surface-conduction emission type electron-emitting devices 15 are arranged in a matrix, is fixed on the rear plate 2. The face plate 3, as an image forming member, where the fluorescent film 7 and the metal back 8 as an acceleration electrode are provided on the inner surface of the glass substrate 6, is provided to be opposite to the electron 1 via the support frame 4 comprising insulating material. The predetermined high voltage is applied between the electron 1 and the metal back 8 from a power source (not shown). The rear plate 2, the support frame 4 and the face plate 3 are fixed with each other with the flit-glass or the like, and these members construct the outer casing 10.

As the outer casing 10 maintains pressure inside about $10^{-6}$ torr vacuum condition, the spacers 5 are provided in the outer casing 10 for the purpose of preventing breakage of the outer casing 10 due to atmospheric pressure or unexpected shock. The spacer 5 comprises the-insulating substrate member 5a and the semiconductive film 5b formed on the insulating substrate member 5a. The spacers 5 of an necessary number are arranged on the inner surface of the outer casing 10 and the front surface of the electron source 1, in parallel in the direction X at necessary intervals, and fixed with the conductive connection member. The semiconductive film 5b is electrically connected to the inner surface of the face plate 3 and the front surface of the electron source 1 (row-direction wiring electrodes 12).

Next, the respective components of the above construction will be described in detail.

(1) Electron Source 1

Figure 3:
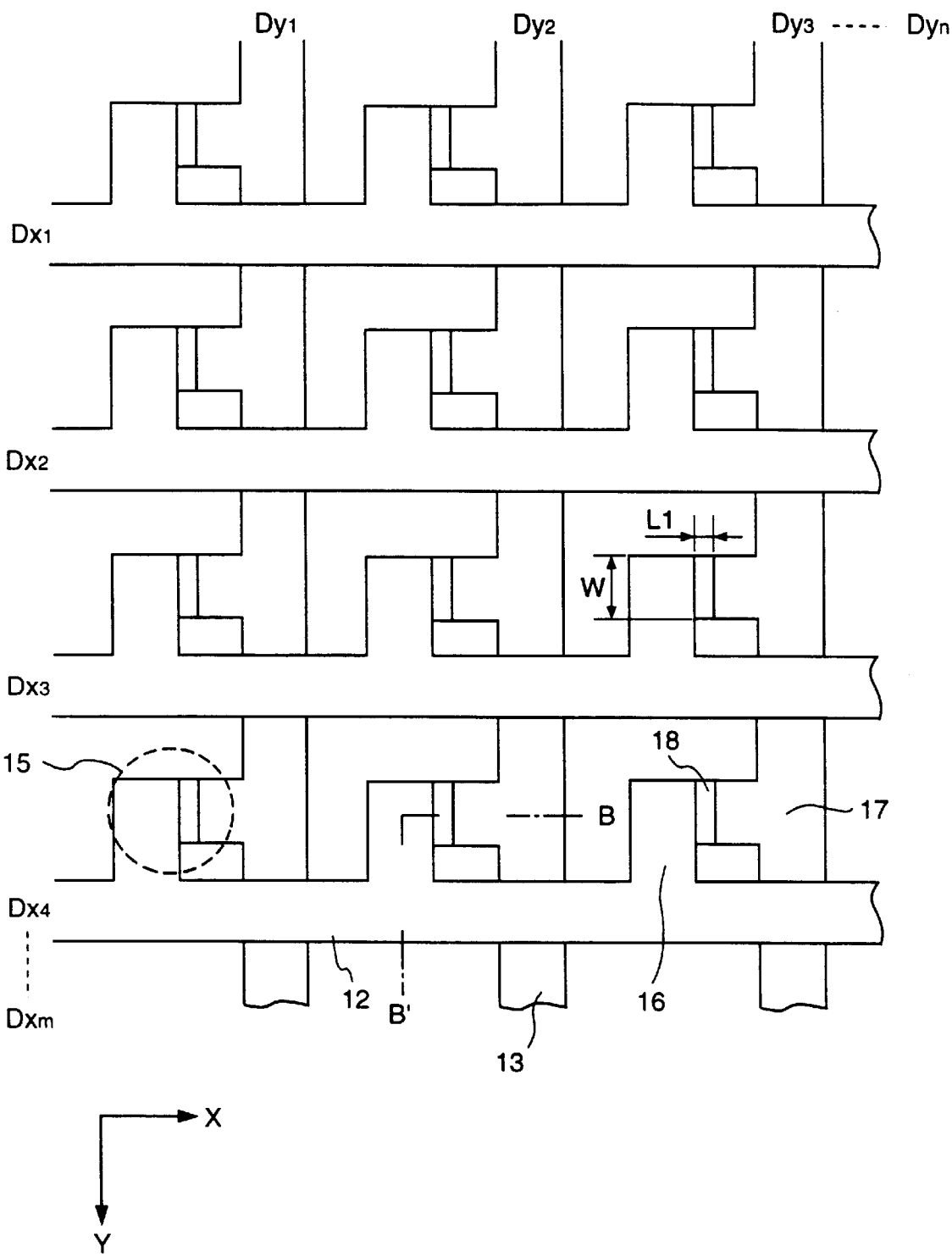
FIG. 3 is a plan view showing a significant part of an electron source 1 of the image forming apparatus in FIG. 1.
Figure 5A:
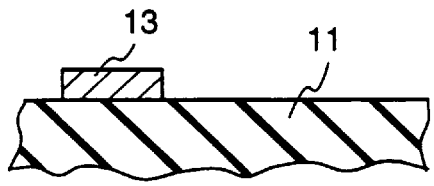
FIGS. 5A to 5H are cross-sectional views respectively showing an electron-source manufacturing process of the present invention.
Figure 5E:
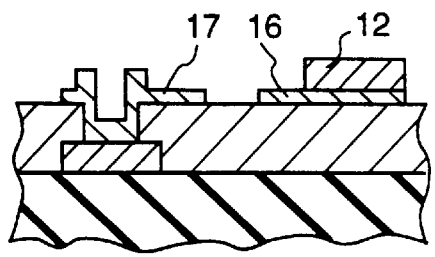
Figure 5B:
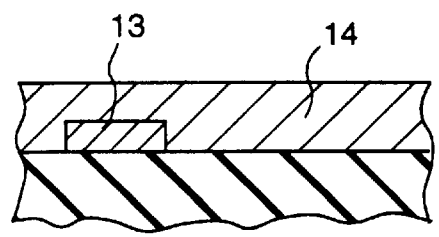
Figure 5F:
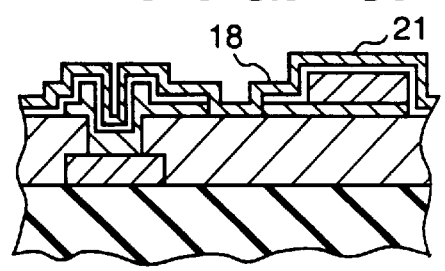
Figure 5C:
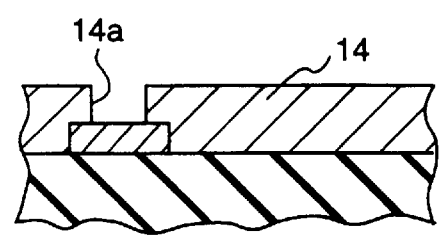
Figure 5G:
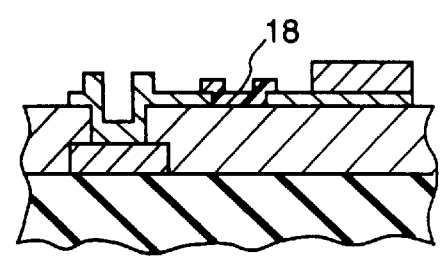
Figure 5D:
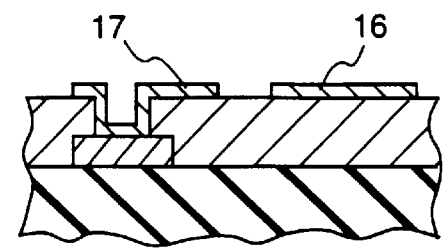
Figure 5H:
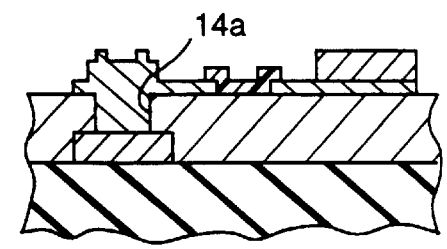

FIG. 3 is a plan view of a significant part of the electron source 1 of the image forming apparatus in FIG. 1, and FIG. 4, a cross-sectional view of the electron source 1 shown in FIG. 3, cut away along the line B–B'.

In FIGS. 3 and 4, m row-direction wiring electrodes 12 and n column-direction wiring electrodes 13 are arranged in a matrix on the insulating substrate 11 comprising a glass substrate or the like, electrically insulated from each other. Each of the electron-emitting devices 15 is electrically connected between a row-direction wiring electrode 12 and a column-direction wiring electrode 13. Each electron-emitting device 15 comprises a pair of device electrodes 16 and 17, and a conductive thin film 18 connecting the electrodes 16 and 17. The device electrode 16 is electrically connected to the row-direction wiring electrode 12, and the device electrode 17, to the column-direction wiring electrode 13. The line- and column-direction wiring electrodes 12 and 13 are pulled out of the outer casing 10 as the external terminals Dox1 to Doxm otherwise Doy1 to Doyn shown in FIG. 1.

As the insulating substrate 11, glass substrates of, e.g., quartz glass, soda-lime glass, soda-lime glass where a $SiO_2$ layer is formed by a sputtering or the like, and a ceramic substrates of alumina or the like can be employed. The size and thickness of the insulating substrate 11 are determined in accordance with the number and the shape of the electron-emitting device 15 provided on the insulating substrate 11, conditions for maintaining vacuum atmospheric status in a case where the electron source 1 itself constitutes a part of the outer casing 10 and the like.

The line- and column-direction wiring electrodes 12 and 13 respectively comprise a conductive metal member formed into a predetermined pattern on the insulating substrate 11, by vacuum evaporation, printing, sputtering and the like. The material, the film thickness and wiring-electrode width of these electrodes are determined so as to supply a voltage as uniform as possible to the electron-emitting devices The insulating film 14 comprises $SiO_2$ material or the like, formed by vacuum evaporation, printing, sputtering and the like. The insulating film 14 is formed in a predetermined form. The thickness, material and manufacturing method of the insulating film 14 are appropriately determined, especially to keep insulation at the intersections of the row-direction wiring electrodes 12 and the column-direction wiring electrodes 13.

The device electrodes 16 and 17 of each electron-emitting device 15 respectively comprise a conductive metal material and respectively formed into a desired pattern by vacuum evaporation, printing, sputtering and the like.

A part or all the constituting elements of the conductive metal material of the device electrodes 16 and 17 may be the same; otherwise, all the elements may be different. These elements are appropriately selected from metals such as Ni, Cr, Au, Mo, W, Pt, Ti, Al, Cu and Pd, alloys, printing conductors comprising metals or metal oxide such as Pd, Ag, Au, $RuO_2$ and Pd—Ag with glass and the like, or transparent conductors such as $In_2O_2$—$SnO_2$ and semiconductive materials such as polysilicon and the like.

The material of the conductive thin film 18 may be a fine-particle film of metals such as Pd, Ru, Ag, Au, Ti, In, Cu, Cr, Fe, Zn, Sn, Ta, W and Pd, oxides such as PdO, $SnO_2$, $In_2O_3$, PbO and $Sb_2O_3$, borides such as $HfB_2$, HfC, $LaB_6$, $CeB_6$, $YB_4$ and $GdB_4$, carbides such as TiC, ZrC, HfC, TaC, SiC and WC, nitrides such as TiN, ZrH and HfN, semiconductors such as Si and Ge.

The row-direction wiring electrodes 12 are electrically connected to scan-signal generating means (not shown) for applying a scan signal for arbitrary scanning of the lines of the electron-emitting devices 15 arrayed along the direction X. On the other hand, the column-direction wiring electrodes 13 are electrically connected to modulation-signal generating means (not shown) for applying a modulation signal for arbitrary modulation of the columns of the electron-emitting devices 15 arrayed along the direction Y. At each electron-emitting device 15, a drive voltage to be applied to the device is supplied as a difference voltage between the scan signal and the modulation signal applied to the electron-emitting device.

Next, an example of manufacturing method of electron source 1 will be described with reference to FIGS. 5A to 5H. Note that the following steps (a) to (h) correspond to FIGS. 5A to 5H.

Step a: A Cr film with a thickness of 50 Å and Au film with a thickness of 5000 Å are sequentially accumulated by vacuum evaporation, on an insulating substrate 11, formed by piling a silicone oxide film with a thickness of 0.5 $\mu$m by sputtering, on a cleaned soda-lime glass material; Photoresist is spin-coated by a spinner, and baking the applied layered film; the photomask image is exposed and developed to form a resist pattern of the column-direction wiring electrodes 13; and the layered Au/Cr film is wet-etched to form the predetermined patterned column-direction wiring electrodes 13.

Step b: Next, the insulating film 14 comprising a silicone oxide film with a thickness of 1.0 $\mu$m is accumulated by RF sputtering.

Step c: To form a contact holes 14a in the silicon oxide film formed at step b, a photoresist pattern is formed. The insulating film 14 is etched using the photoresist pattern as the etching mask, thus the contact holes 14a are formed. The etching is made in accordance with an RIE (Reactive Ion Etching) method using CF4 and H2 gas.

Step d: Thereafter, a pattern to be a gap between the device electrodes is formed with the photoresist (RD-2000N-41 by Hitachi Chemical Co. Ltd.), and a Ti film with a thickness of 50 Å and a Ni film with a thickness of 1000 Å are sequentially accumulated by vacuum evaporation.

The photoresist pattern is dissolved with an organic solvent, and the layered Ni/Ti film is lifted off, then the device electrodes 16 and 17, having a width of 300 $\mu$m (device-electrode width W1) are formed at 3 $\mu$m intervals (device-electrode interval L1 (see FIG. 3)).

Step e: Ag electrodes as the row-direction wiring electrodes 12 are formed by screen-printing, on the device electrodes 16 and 17. The formed wiring-electrodes have a thickness of 20 $\mu$m, and wiring-electrode width is 300 $\mu$m.

Figure 6:
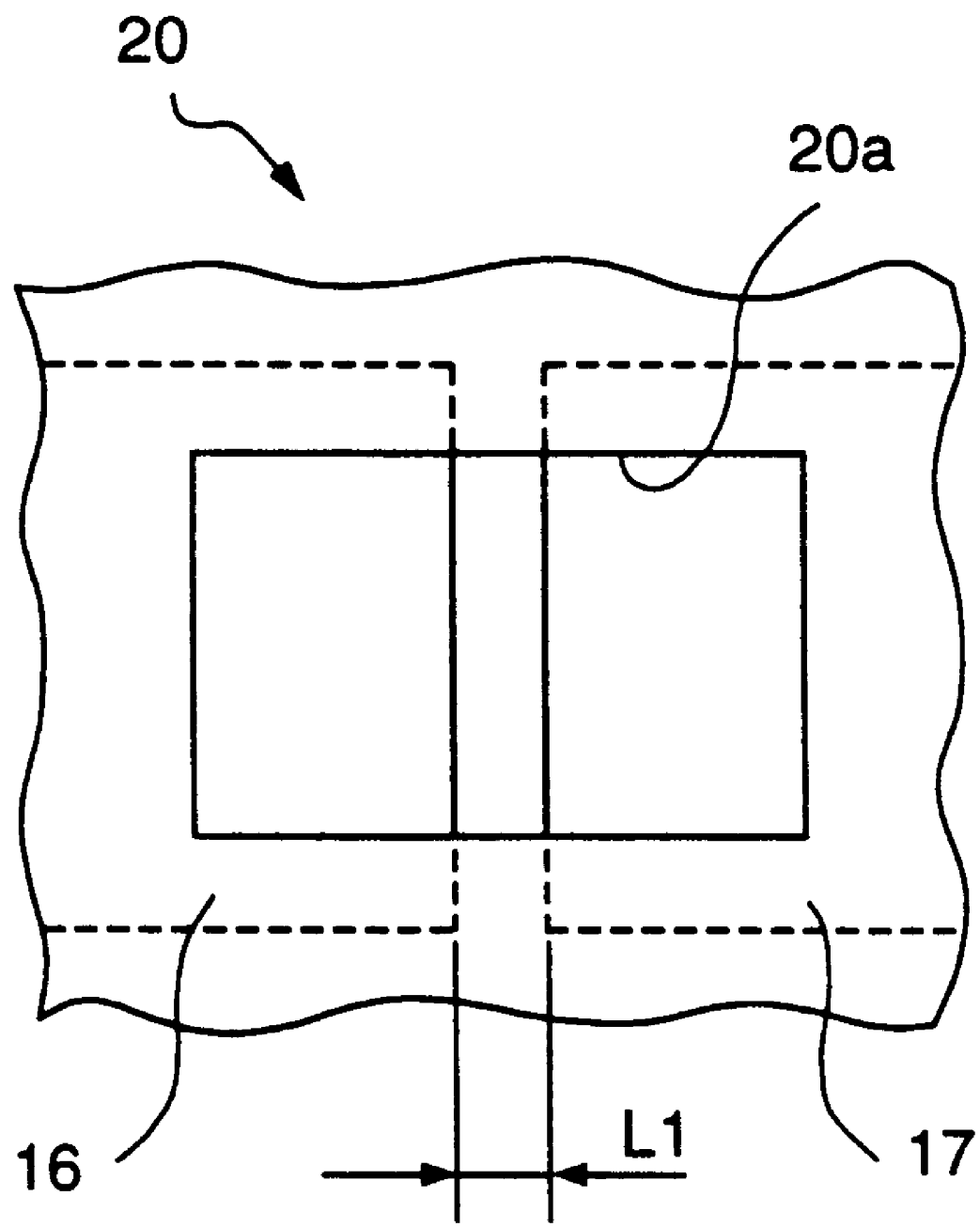
FIG. 6 is a plan view showing the electron source in pre-manufacture status.

Step f: A pattern of Cr film 21 with a thickness of 1000 521 is accumulated by vacuum evaporation, using a mask having openings 20a each covers each pair of device electrodes 16 and 17, positioned at the intervals L1 as shown in FIG. 6. An organic solvent (ccp4230 by Okuno Pharmaceutical Co. Ltd.) is spin-coated onto the pattern, then sintering process is made at 300° C. for 10 minutes.

The conductive thin film 18 of a fine-particles including Pd as main element, formed in the above manner has a thickness of about 100 Å and a sheet resistance value of $5\times10^4$. The fine-particle film is a film where a plurality of fine particles are gathered. The minute structure is not only a state where the particles are scattered but also a state where the particles are adjacent to each other, or they are overlapped with each other (island-formed state included).

Note that the organic solvent (organic Pd solvent in this embodiment) is a solvent of an organic compound mainly including metal(s) such as Pd, Ru, Ag, Au, Ti, In, Cu, Cr, Fe, Zn, Sn, Ta and W. In this example, the conductive thin film 18 is manufactured by application of an organic solvent, however, this does not limit the method for manufacturing the conductive thin film 18. The conductive thin film 18 may be formed by vacuum evaporation, sputtering, chemical vapor deposition, scattered applying, dipping, spinner method or the like.

Step g: The Cr film 21 is removed by an acid etchant and the conductive thin film 18 of a desired pattern is formed.

Step h: A pattern for applying resist material to portions other than the contact holes 14a is applied, and a Ti film with a thickness of 50 Å and an Au film with a thickness of 5000 Å are sequentially accumulated by vacuum evaporation, on the pattern. Unnecessary portions are removed by lift-off operation. Thus, the contact holes 14a are filled.

Though the above steps, the row-direction wiring electrodes 12, the column-direction wiring electrodes 13 and the conductive thin film 18 are formed two-dimensional manner, at equal intervals, on the insulating substrate 11.

Then, the air within the outer casing 10 (FIG. 1) including the electron source 1 is exhausted by a vacuum pump through an exhaust pipe (not shown). After the atmospheric condition there reaches a sufficient vacuum level, a predetermined voltage is applied between the device electrodes 16 and 17 through the external terminals Dox1 to Doxm, or Doy1 to Doyn. Thus the electron-emitting portion 23 is formed by electrification (forming) process on the conductive thin film 18.

Next, the forming processing will be described with reference to FIGS. 21 and 7. In these figures, numerals 1102 and 1103 denote device electrodes; 1104, a conductive thin film; 1105, an electron-emitting portion; 1110, a forming power source; and 1111, a galvanometer.

Figure 21:
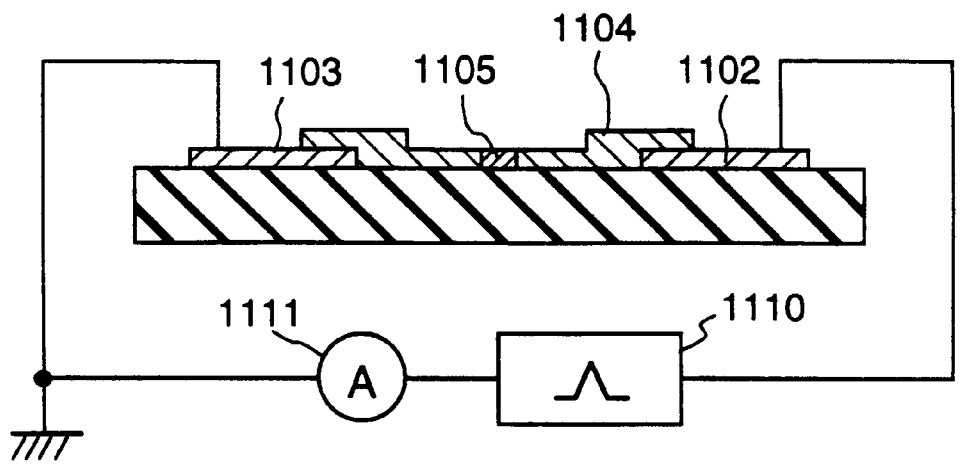
FIG. 21 is a cross-sectional view for explaining the forming processing according to the first embodiment.

As shown in FIG. 21, an appropriate voltage from the forming power source 1110 is applied between the device electrodes 1102 and 1103, thus the forming processing is made, and the electron-emitting portion 1105 is formed.

The forming processing is electrification of the conductive thin film 1110 of a fine-particle film, so as to partially destroy or deform the film, otherwise change the film in quality, for obtaining a structure preferable to perform electron emission. In such structure (i.e., the electron-emitting portion 1105), the thin film has an appropriate fissure. Note that after the electron-emitting portion 1105 has been formed, electric resistance measured between the device electrodes 1102 and 1103 is increased greatly.

Figure 7:
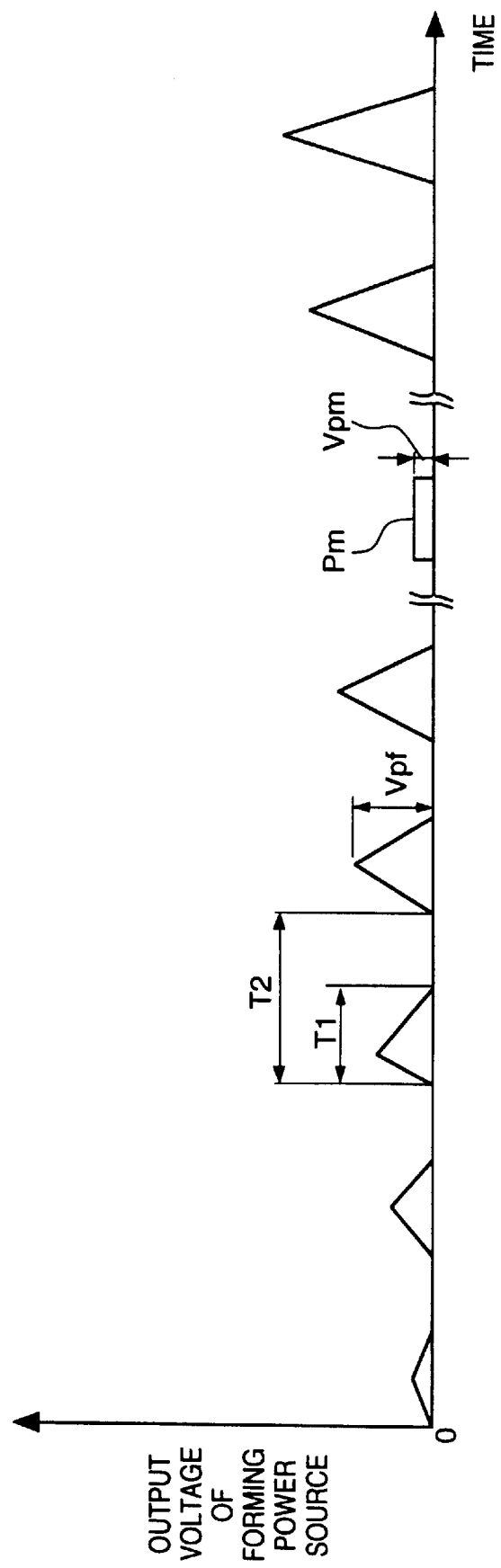
FIG. 7 is a line graph showing an example of waveform of voltage used in an electrification forming-process for forming electron-emitting devices in the embodiment.

FIG. 7 shows an example of voltage waveform from the forming power source 1110 for detailed explanation of the forming processing. To perform forming processing on a conductive thin film of a fine-particle film, pulse waveform is preferable for the voltage to be applied. In the present embodiment, a triangular pulse having a pulsewidth T1 is continuously applied at pulse intervals T2, as shown in FIG. 7. Upon application, a wave peak value Vpf of the triangular-wave pulse is sequentially increased.

In this example, in $10^{-5}$ Torr vacuum atmosphere, the pulsewidth T1 is set to 1 msec; and the pulse interval T2, to 10 msec. The wave peak value Vpf is increased by 0.1 V, at each pulse. Each time the triangular-wave has been applied for five pulses, the monitor pulse Pm is inserted. To avoid ill-effecting during the forming processing, a voltage Vpm of the monitor pulse is set to 0.1 V. When the electric resistance between the device electrodes 1102 and 1103 becomes $1\times10^6$ Ω, i.e., the current measured by the galvanometer 1111 upon application of monitor pulse becomes $1\times10^{-7}$ Ω or less, the electrification of the forming processing is terminated.

Note that the above processing method is preferable to the SEC type electron-emitting device of the present embodiment. In case of changing the design of the SEC type electron-emitting device concerning, e.g., the material or thickness of the fine-grained film, or the device electrode interval L, the conditions for electrification are preferably changed in accordance with the change of device design.

Figure 22:
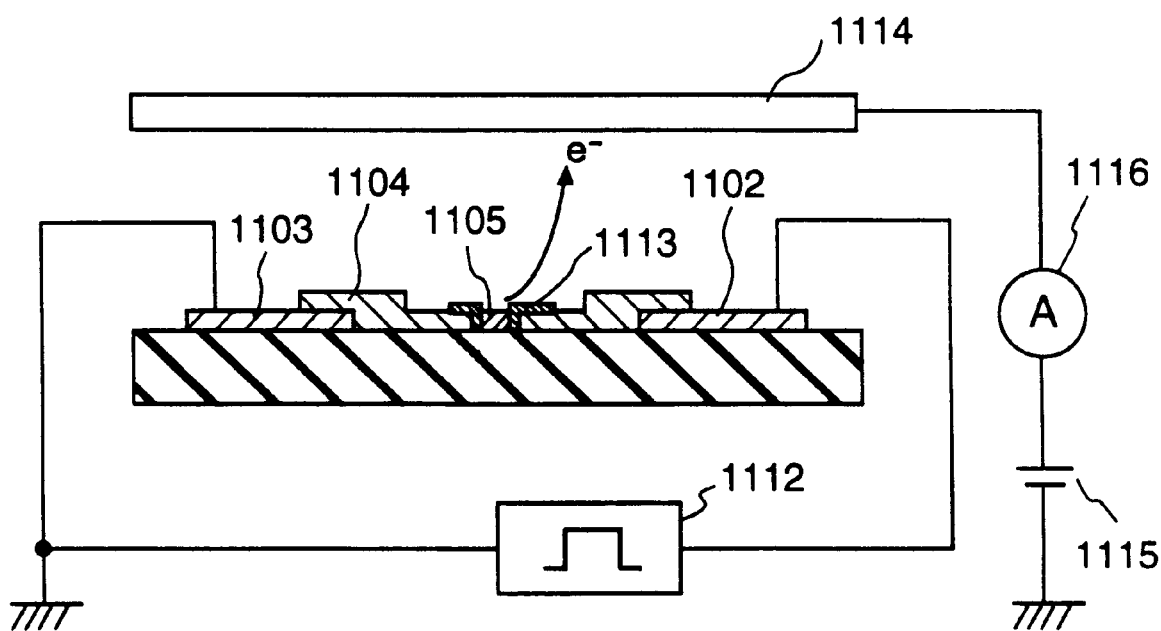
FIG. 22 is a cross-sectional view for explaining electrification activation process according to the first embodiment.

Next, electrification activation process will be described with reference to FIGS. 22, 23A and 23B. In FIG. 22, numeral 1112 denotes an electrification activation power source; 1113, an accumulated material; 1114, an anode; 1115, a direct-current high-voltage power source; and 1116, a galvanometer.

The electrification activation processing here is electrification of the electron-emitting portion 1105, formed by the forming processing, on appropriate conditions), for accumulating carbon or carbon compound around the electron-emitting portion 1105 (In FIG. 22, the accumulated material of carbon or carbon compound is shown as material 1113). Comparing the electron-emitting portion 1105 with that before the electrification activation processing, the emission current at the same applied voltage has become, typically 100 times or greater.

The electrification activation is made by periodically applying a voltage pulse in $10^{-4}$ or $10^{-5}$ Torr vacuum atmosphere, to accumulate carbon or carbon compound mainly derived from organic compound(s) existing in the vacuum atmosphere. The accumulated material 1113 is any of graphite monocrystalline, graphite polycrystalline, amorphous carbon or mixture thereof. The thickness of the accumulated material 1113 is 500 Å or less, more preferably, 300 Å or less.

Figure 23A:
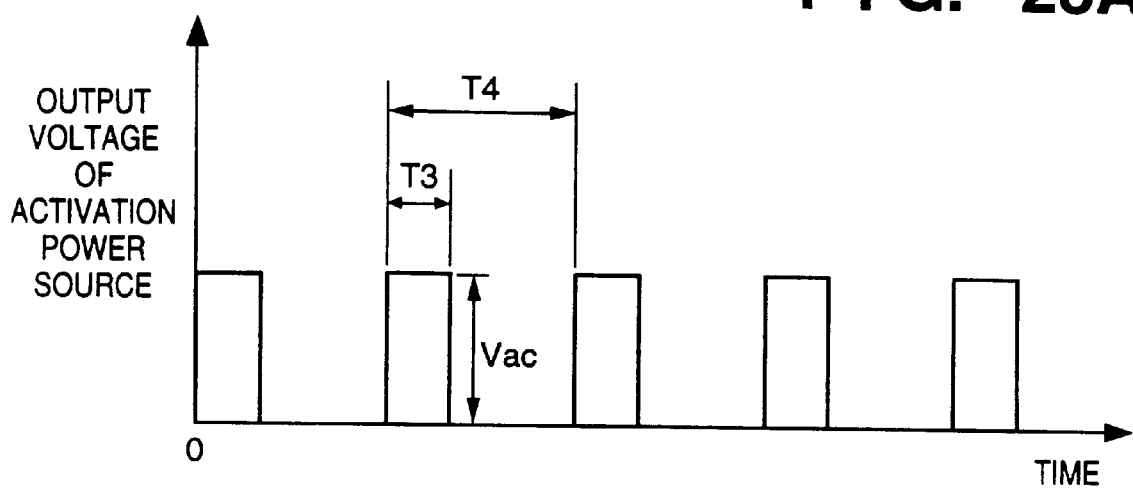
FIG. 23A is a line graph showing an example of a signal applied in the electrification activation process.
Figure 23B:
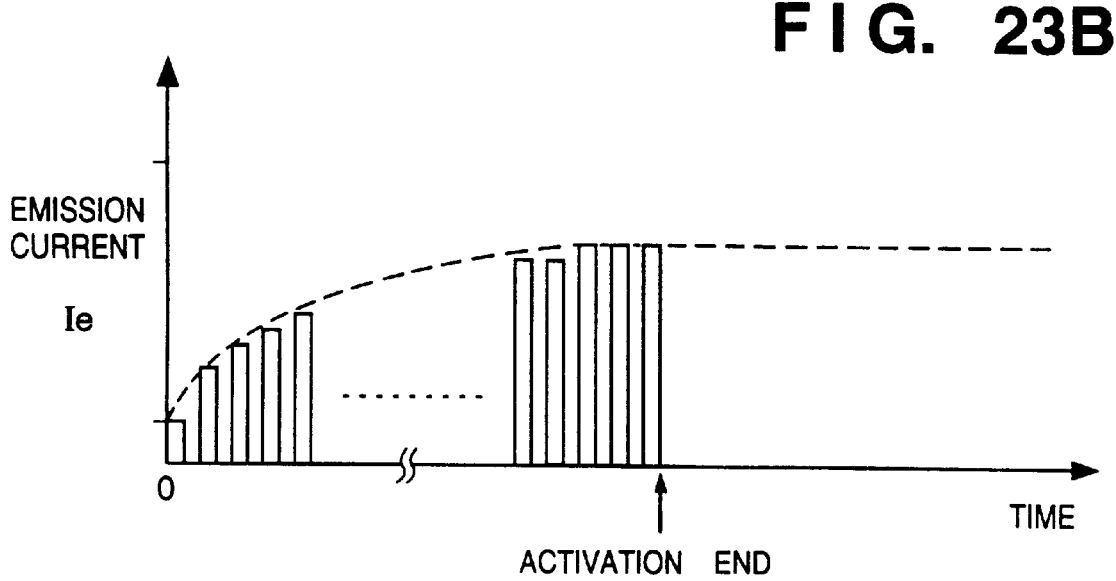
FIG. 23B is a histogram showing the relation between electrification activation process amount (time) and the emission current Ie.

The electrification activation processing will be described in more detail with reference to FIG. 23A showing an example of waveform of appropriate voltage applied from the electrification activation power source 1112. In this example, a rectangular-wave voltage Vac is set to 14 V; a pulsewidth T3, to 1 msec; and a pulse interval T4, to 10 msec. Note that the above electrification conditions are preferable for the surface-conduction emission type electron-emitting device of the embodiment. In a case where the design of the surface-conduction emission type electron-emitting device is changed, the electrification conditions are preferably changed in accordance with the change of device design.

In FIG. 22, the anode 1114 is connected to the direct-current high-voltage power source 1115 and the galvanometer 1116, for monitoring emission current Ie emitted from the surface-conduction emission type electron-emitting device (in a case where a substrate 1101 is incorporated into the outer casing of the display panel before the electrification activation processing, the fluorescent surface of the display panel is used as the anode electrode 1114).

While applying voltage from the electrification activation power source 1112, the galvanometer 1116 measures the emission current Ie, thus monitors the progress of electrification activation processing, to control the operation of the electrification activation power source 1112. FIG. 23B shows an example of the emission current Ie measured by the galvanometer 1116. In this example, as application of pulse voltage from the electrification activation power source 1112 is started, the emission current Ie increases with elapse of time, gradually comes into saturation, and almost never increases then. At the substantial saturation point, the voltage application from the electrification activation power source 1112 is stopped, then the electrification activation processing is terminated.

Note that the above electrification conditions are preferable to the surface-conduction emission type electron-emitting device of the embodiment. In case of changing the design of the surface-conduction emission type electron-emitting device, the conditions are preferably changed in accordance with the change of device design.

As described above, the flat surface-conduction emission type electron-emitting device is manufactured.

Figure 8:
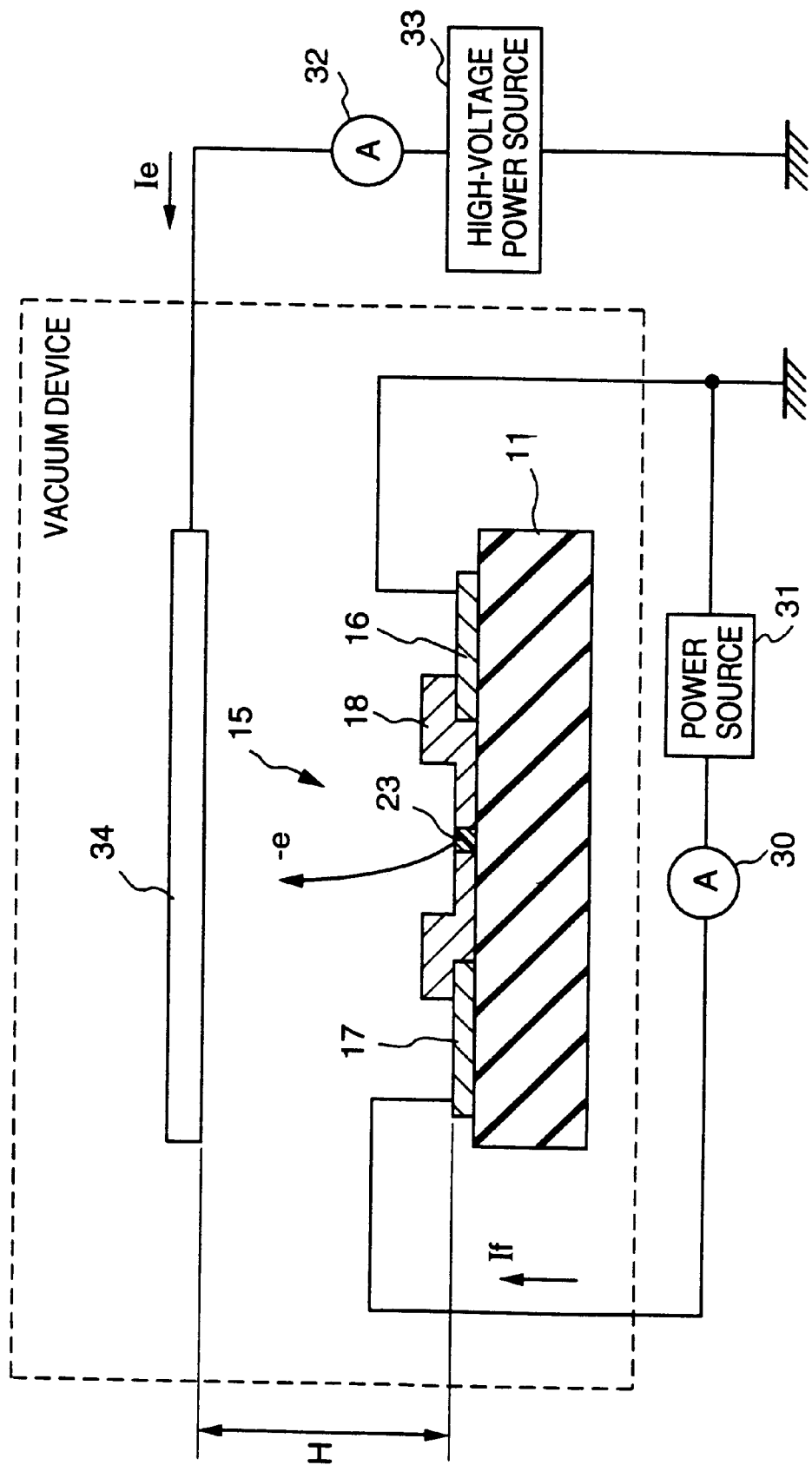
FIG. 8 is a block diagram showing the construction, estimation and operation of the electron source with one electron-emitting device.

Next, evaluation of electron-emitting characteristic of the electron-emitting device of the present invention, having the above construction manufactured as above, will be described with reference to FIG. 8 showing the schematic construction of an evaluation device.

FIG. 8 shows an electron source having one electron-emitting device. In FIG. 8, numeral 11 denotes an insulating substrate; 15, an electron-emitting device formed on the insulating substrate 11; 16 and 17, device electrodes; 18, a thin film including an electron-emitting portion; and 23, the electron-emitting portion. Numeral 31 denotes a power source for applying a device voltage Vf between the device electrodes 16 and 17; 30, a galvanometer for measuring a device current If that flows through the thin film 18 between the device electrodes 16 and 17; 34, an anode for capturing an emission current Ie emitted from the electron-emitting portion 23; 33, a high-voltage power source for applying a voltage Va to the anode 34; and 32, a galvanometer for measuring the emission current Ie from the electron-emitting portion 23. For measurement of the device current If and the emission current Ie, the device electrodes 16 and 17 are connected to the power source 31 and the galvanometer 30, and the anode 34 connected to the power source 33 and the galvanometer 32 is provided above the electron-emitting device 15. The electron-emitting device 15 and the anode 34 are arranged within the vacuum device which comprises necessary tools such as an exhaust pump, a vacuum system (both not shown) and the like and which can perform the measurements at a desired vacuum condition.

Note that the voltage Va applied to the anode 34 is set to 1 to 10 kV; and a distance H between the anode 34 and the electron-emitting device 15, 3 to 8 mm.

Next, the electron-emitting characteristic, observed by the present inventors, as the principle of the present invention will be described below.

Figure 9:
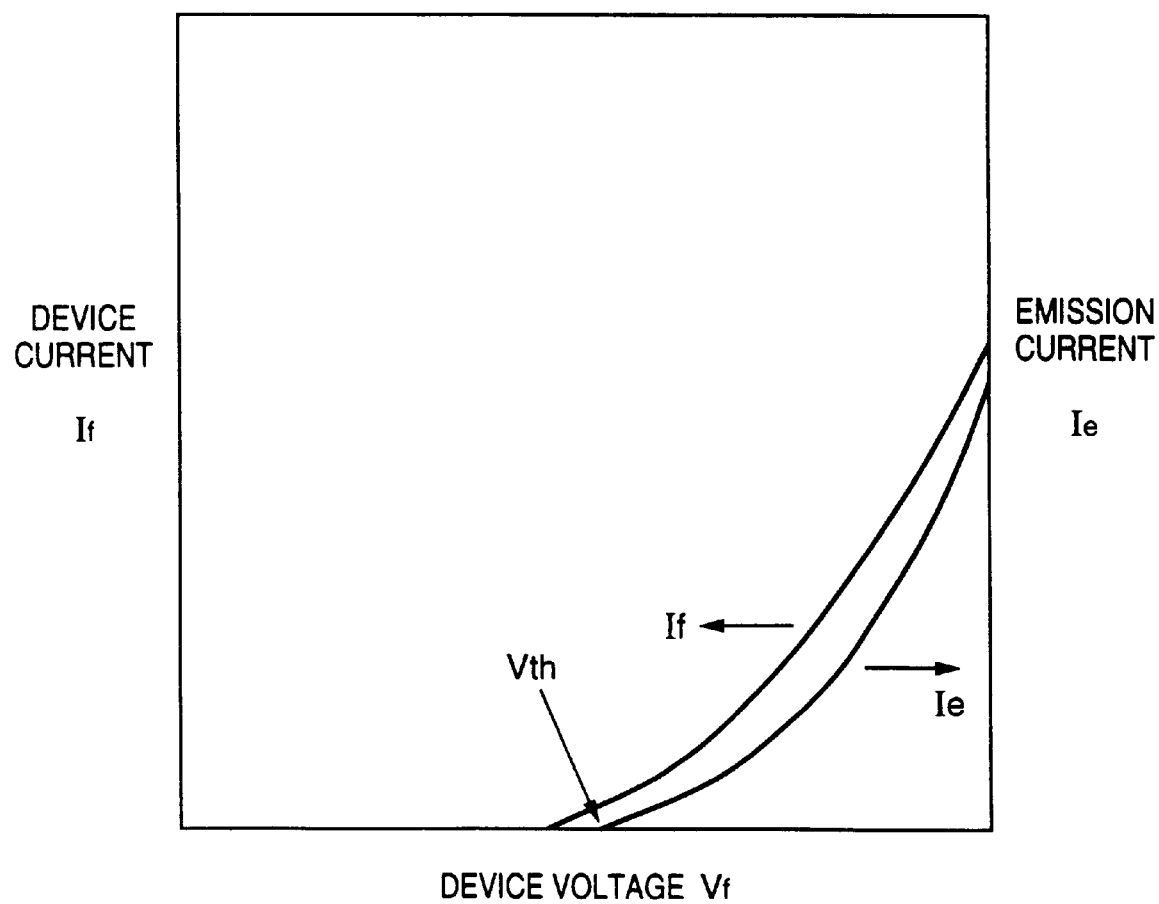
FIG. 9 is a line graph showing the relation between an emission current Ie and a device current If of the electron-emitting device, measured by a measurement estimation device.

FIG. 9 shows a typical example of the relation among the emission current Ie, the device current If and the device voltage Vf, measured by the evaluation device in FIG. 8. Since the values of the emission current Ie and the device current If are extremely different, FIG. 9 represents the values at arbitrary units. As it is apparent from FIG. 9, the electron-emitting device according to the present invention has the following three characteristics with respect to the emission current Ie.

First, at the present electron-emitting device, if the device voltage Vf at a predetermined level, i.e., a threshold voltage Vth (see FIG. 9) or higher is applied, the emission current Ie value increases drastically. On the other hand, if the device voltage Vf at a lower level than the threshold voltage, the emission current Ie value is almost zero. That is, the present electron-emitting device has a non-linear electron-emitting characteristic with the clear threshold voltage Vth with respect to the emission current Ie. Regarding the device current If, the electron-emitting device has so-called MI characteristic where the device current If increases monotonously with respect to the device voltage Vf.

Secondly, since the emission current Ie depends on the device voltage Vf, the emission current Ie can be controlled by controlling the device voltage Vf.

Thirdly, the emission charge captured by the anode 34 depends on time for applying the device voltage Vf. That is, the amount of the electric charge captured by the anode 34 can be controlled with the time for applying the device voltage Vf.

(2) Fluorescent Film 7

Figure 10A:
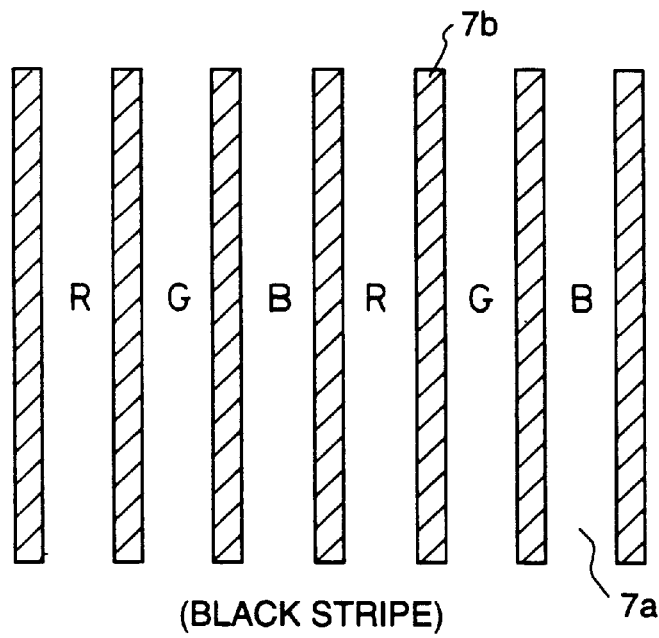
FIGS. 10A and 10B are plan view showing examples of the structure of a fluorescent film 7 in the embodiment.

For monochromatic image formation, the fluorescent film 7 (FIG. 1) only comprises a fluorescent member, however, for color image formation, it comprises a black conductive material 7b, referred to as "black stripe" or "black matrix", and a fluorescent material 7a as shown in FIG. 10a. The purpose of providing the black stripe or black matrix is to render color mixture of respective three-primary colors inconspicuous by blackening the boundaries between the respective color fluorescent substances 7a, and to reduce degradation of contrast due to external light reflection at the fluorescent film 7. The material of the black conductive member 7b may be any conductive material that has a low light-transmittance and a low reflectance, as well as normally used graphite. The application of the fluorescent material 7a to the glass substrate 6 is made by precipitation or printing, regardless of monochrome or color image formation.

Figure 10B:
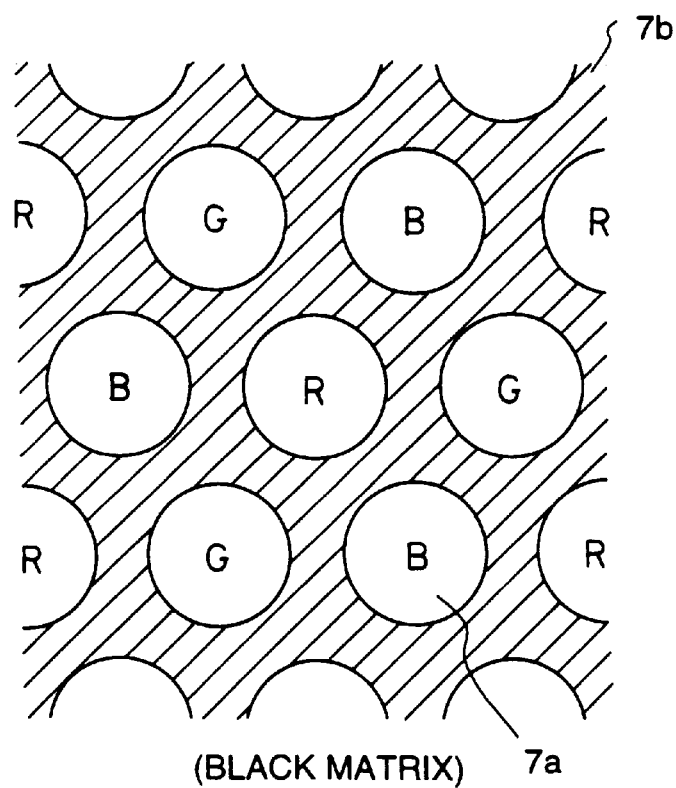

Further, the coloring of the fluorescent material 7a in three primary-colors is not limited to the stripe arrangement as shown in FIG. 10A, but delta arrangement as shown in FIG. 10B or other arrangement can be employed.

Note that when a monochrome display panel is manufactured, a monochromatic fluorescent material may be used.

(3) Metal Back 8

The purpose of providing the metal back 8 (FIG. 1) is to improve luminance by mirror-reflecting light toward the inner surface side, in the light emitted from the fluorescent material 7a, to the face plate 3 side, and to act as acceleration electrode for application of electron-beam accelerating voltage, and to protect the fluorescent material 7a from damaging due to collisions of negative ions generated in the outer casing 10. The metal back 8 is formed as follows. After the fluorescent film 7 has been formed, smoothing (generally referred to as "filming") is performed on the inner surface of the fluorescent film 7, then Al is accumulated on the smoothed surface by vacuum evaporation or the like. To improve conductivity of the fluorescent film 7, the face plate 3 may have a transparent electrode (not shown) such as ITO, between the fluorescent film 7 and the glass substrate 6.

(4) Outer Casing 10

The outer casing 10 (FIG. 1) is sealed after about $10^{-6}$ torr vacuum condition is obtained. Preferably, the rear plate 2, the face plate 3 and the support frame 4 constructing the outer casing 10 can maintain the vacuum atmosphere and have insulation resistance against the high voltage applied between the electron source 1 and the metal back 8. The materials of these members may be glass materials such as quartz glass, soda-lime glass, ceramic materials such as alumina. Regarding the respective members constituting the outer casing 10, it is preferable to combine materials having thermal-expansion coefficients close to each other.

In a case where the outer casing 10 is constructed in a color image forming apparatus, the respective color fluorescent materials 7a must be arranged corresponding to the respective electron-emitting devices. For this reason, the position of the face plate 3 having the fluorescent materials 7a and that of the rear plate 2 where the electron source 1 is fixed must be aligned with high precision.

To maintain vacuum condition after sealing the outer casing 10, gettering processing may be performed. This is done by heating a getter (not shown) at a predetermined position in the outer casing 10, by high-frequency heating or the like, to form a film by evaporation, immediately after or before sealing. The getter normally has Ba as its main element, and it maintains about $10^{-6}$ or $10^{-7}$ vacuum condition by the above absorption of the film formed by evaporation.

(5) Spacer 5

As described above, the spacer 5 must have mechanical strength against the atmospheric pressure, insulation resistance against the high voltage applied between the electron source 1 and the metal back 8, and surface conductivity to prevent electric charge on the spacer itself.

Accordingly, in the present embodiment, the spacer 5 comprises an insulating member, having sufficient mechanical strength, coated with a semiconductive film.

FIG. 2 shows the structure of the spacer 5 of the present embodiment.

As the insulating substrate member 5a of the spacer 5, glass materials such as quartz glass, soda-lime glass, and ceramic materials such as alumina may be employed. Preferably, the material of the insulating substrate member 5a has a thermal-expansion coefficient close to that of the outer casing 10 and the insulating substrate 11 of the electron source 1.

In the present embodiment, the material of the spacer 5 is soda-lime glass plate on which the semiconductive film 5b of tin oxide is formed. The height of the spacer 5 is 5 mm; the thickness, 200 μm; and the length, 20 mm.

(Semiconductive Film)

Preferably, the semiconductive film 5b has a, surface resistance ranging from $10^5$ to $10^{12}$, for maintaining prevention of electric charge-up and saving electric consumption due to leakage current. The material of the semiconductive film 5b may be a metal film containing an island-shaped adjacent or overlapped particles, made of; noble metals such as Pt, Au, Ag, Rh and Ir, or metals such as Al, Sb, Sn, Pb, Ga, Zn, In, Cd, Cu, Ni, Co, Rh, Fe, Mn, Cr, V, Ti, Zr, nb, Mo and W, and alloys comprising a plurality of metals, otherwise, conductive oxides such as $SnO_2$ and ZnO.

The semiconductive film 5b is formed by selecting appropriate one of a film-forming method such as vacuum evaporation, sputtering, chemical gaseous-phase accumulation, or an application method such as dipping of an organic solvent or scattered-particle solvent, or applying and sintering such solvent, or an electroless plating method to form a metal film on the surface of an insulating member by utilizing chemical reaction of a metal compound.

The semiconductive film 5b is formed in a part, which is at least exposed in the vacuum atmosphere within the outer casing 10, of the surface of the insulating substrate member 5a. The semiconductive film 5b is electrically connected to, e.g., the black conductive material 7b or the metal back 8 on the face plate 3 side, and to the row-direction wiring electrodes 12 on the electron source 1 side.

Regarding the spacer 5, the structure, setting position, setting method and electrical connection on the face plate 3 side and the electron 1 side are not limited to the above example. The semiconductive film 5b may be of any material, as far as it can maintain the vacuum atmosphere against the atmospheric pressure and has insulation resistance against high voltage applied between the electron source 1 and the metal back 8, further it has surface conductivity at a level to prevent electric charge-up on the surface of the spacer 5.

In this embodiment, as the semiconductive film 5b, a tin oxide film of a thickness of about 1000 Å is formed by ion plating. The surface resistance in this case is 104 to 012.

(Conductive Member)

Figure 13:
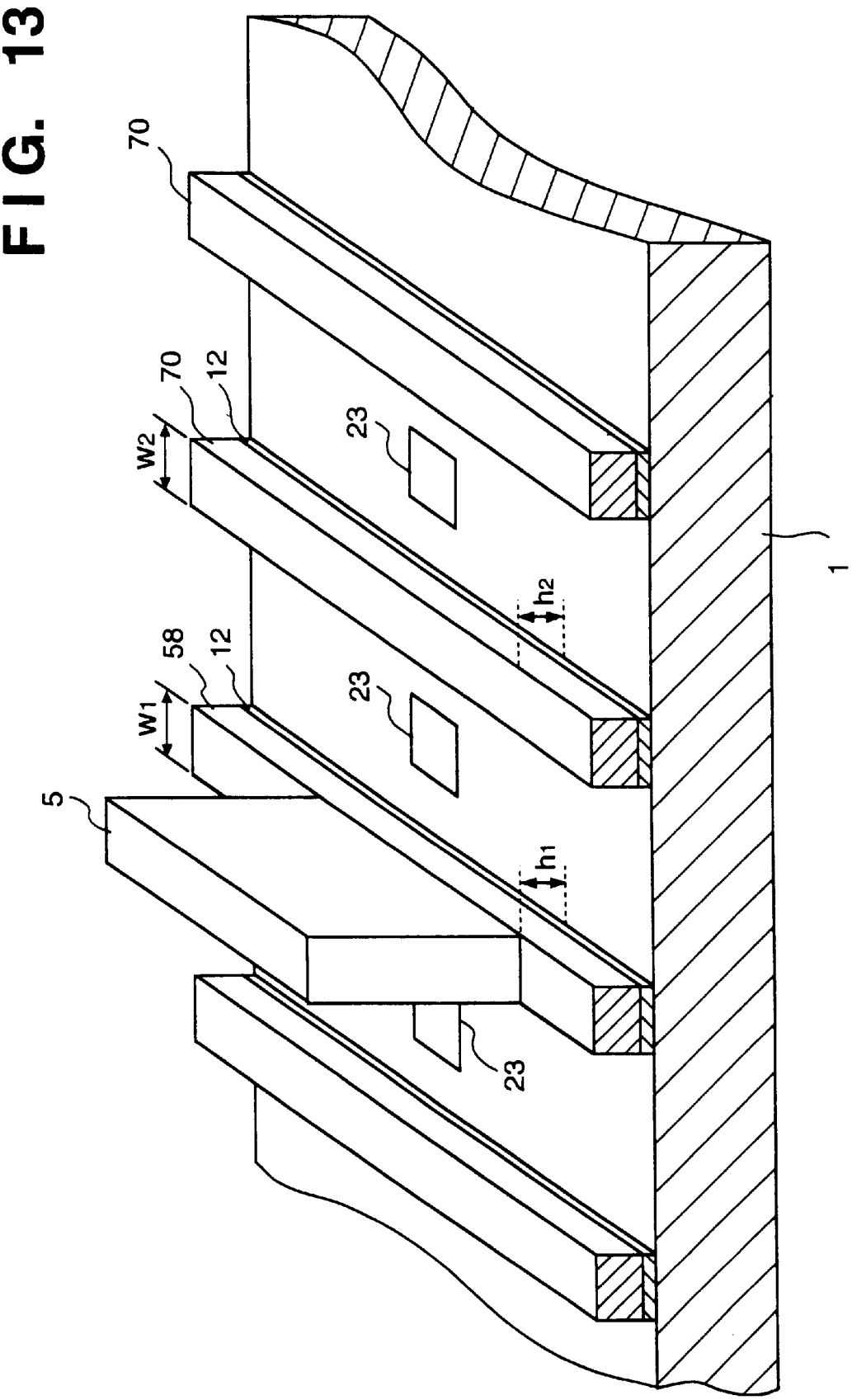
FIGS. 13 and 14 are perspective views respectively showing the arrangement of support members (spacers) of the embodiment.

Next, the conductive connection member 58 to firmly connect the support member (spacer) and to attain electrical connection with the spacer, and the conductive member 70 of the present invention will be described with reference to FIG. 13.

Regarding the electron-emitting devices, electrically connected to the wiring electrodes, only the electron-emitting portion 23 is shown to avoid complexity of illustration.

In this embodiment, the spacers 5 are provided on some of the row-direction wiring electrodes 12 via the conductive connection members 58, and the conductive members 70 are provided on the other row-direction wiring electrodes 12, such that the height of the upper surface of the conductive connection member 58 ($h_1$ in FIG. 13) and that of the conductive member 70 ($h_2$ in FIG. 13) are the same.

By this arrangement, the electric-potential distribution on the spacer surface and that in the space above the row-direction wiring electrode without the spacer 5 are equal to each other. That is, if the spacer 5 is provided on one row-direction wiring electrode 12 with the conductive connection member 58, electro-optical characteristic similar to that of the other row-direction wiring electrodes can be realized.

Since any electron beams emitted by any electron-emitting portions 23 transverse similar trajectories, the conventional problems such as shift of light-emission point, luminance degradation and change of color do not occur.

Note that to optimize the above feature, the conductive connection members 58 and the conductive members 70 should preferably have the same width ($w_1=w_2$) in addition to the condition $h_1=h_2$, then the settings of the present embodiment are made in accordance with the above conditions. ($w_1$: width of conductive connection member 58, $w_2$: width of conductive member 70).

Next, the manufacturing of the image forming apparatus according to the first embodiment will be described.

In the present embodiment, the conductive connection member 58, which holds the spacer 5 and makes electrical connection with the spacer 5, is formed by dispersing Au-plated soda-lime glass balls, as filler, in the flit-glass paste, and applying and sintering the paste. In this example, the soda lime balls have an average diameter of 8 µm. As the conductive layer of the filler surface, a Ni film with a thickness of 0.1 µm, as a base, and an Au film with a thickness of 0.04 µm, on the base, are sequentially formed by electroless plating. The paste to be applied is formed by mixing the conductive filler at 30 wt % with respect to the flit-glass paste, and further adding a binder to the mixture.

The conductive flit-glass paste is applied to the row-direction wiring electrode 12 of the electron source 1, by a dispenser, such that the applied width is the same as the width of the electrode. After application, the spacer 5 is aligned with conductive connection member 58, then connected portion is sintered in the atmosphere at 400° C. to 500° C. for 10 minutes or longer. On the face plate 3 side, the conductive flit-glass paste is applied to the end of the spacer 5, also by a dispenser. The conductive flit-glass paste is provided in correspondence with the black conductive material 7b (with 300 µm line width), then sintered in the atmosphere at 400° C. to 500° C. for 10 minutes or longer. This holds the connection between the electron source 1 and the black conductive material 7b and the spacer 5. The width of the conductive connection member 58 is 300 µm, the same as that of the row-direction wiring electrode 12, and the thickness of the conductive connection member 58 is 400 µm. The conductive member 70 of the present invention comprises the same material as that of the conductive connection member 58.

(6) Driving Method

A driving method for driving the above-described image forming apparatus will be described with reference to FIGS. 15 to 18.

Figure 15:
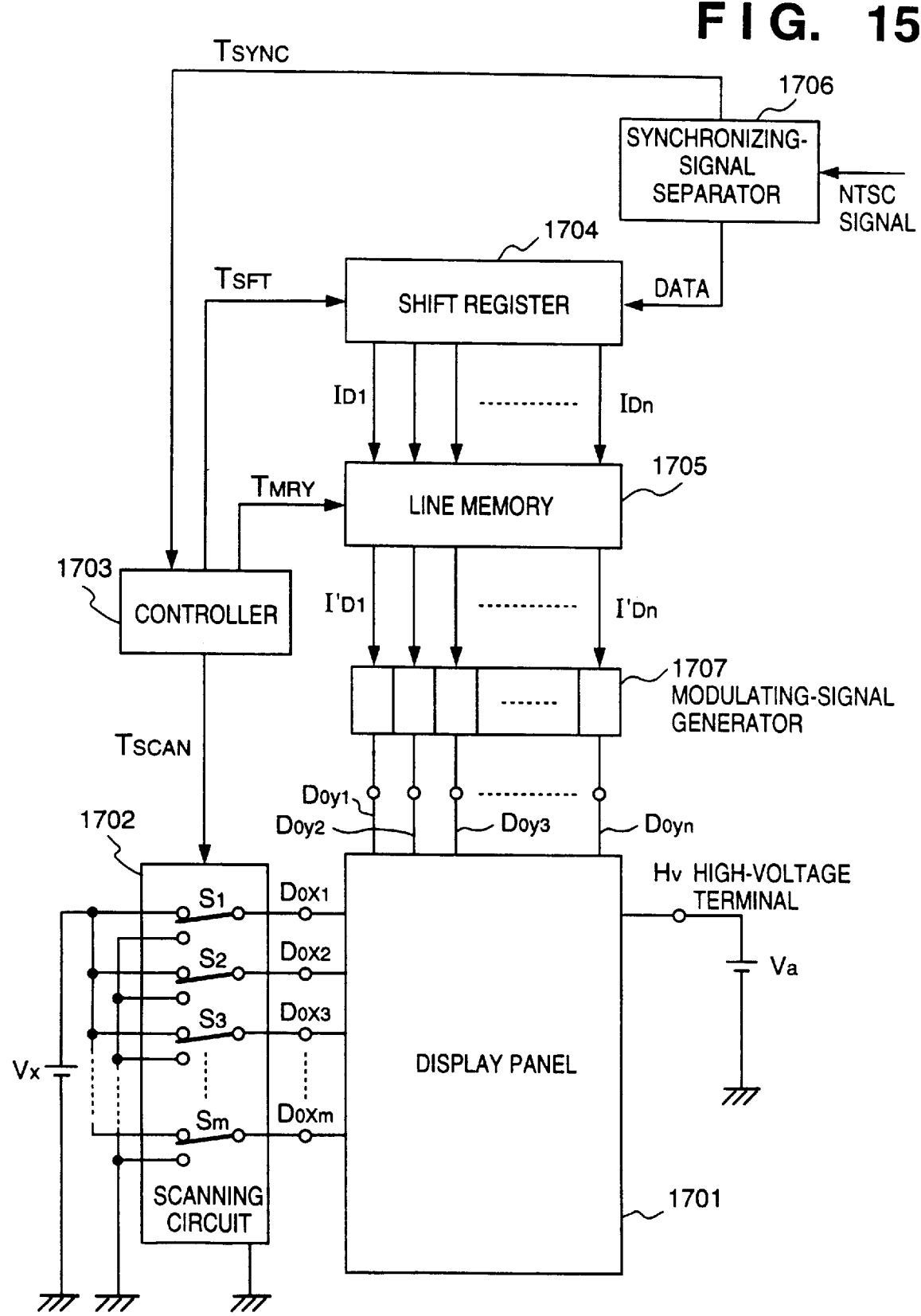
FIG. 15 is a block diagram showing the construction of a driver of the image forming apparatus of the embodiment.

FIG. 15 is a block diagram showing the construction of a driver for television display based on a TV signal in conformance with the NTSC standards. In FIG. 15, a display panel 1701 is an image forming apparatus manufactured and operates as above. A scanning circuit 1702 operates display lines, and a controller 1703 generates a signal to be inputted into the scanning circuit and the like. A shift register 1704 shifts data for one line, and a line memory 1705 inputs the one-line data from the shift register 1704 into a modulating-signal generator 1707. A synchronizing-signal separator 1706 separates a synchronizing signal from the NTSC signal.

Next, the function of the respective components in FIG. 15 will be described in detail.

The display panel 1701 is connected to external electric signals via terminals Dox1 to Doxm and terminals Doy1 to Doyn, and via a high-voltage terminal Hv. The terminal Dox1 to Doxm receives a scanning signal for sequentially driving an m×n matrix-arranged electron-emitting devices of an electron source provided in the display panel 1701, by one line (n devices).

On the other hand, the terminal Doy1 to Doyn receives a modulating signal for controlling electron beams outputted from the respective electron-emitting devices of a selected one line. The high-voltage terminal Hv receives a high voltage of, e.g., 5 kV, which is the accelerating voltage that provides the electrons with sufficient energy to excite the fluorescent member, from a direct-current voltage source Va.

Next, the scanning circuit 1702 will be described below.

The scanning circuit 1702 has m switching devices S1 to Sm electrically connected to the terminals Dox1 to Doxm of the display panel 1701. Each switching device selects the output voltage of a direct-current voltage source Vx or ground level 0V. The switching devices S1 to Sm respectively operate in accordance with a control signal Tscan outputted from the controller 1703. These devices are easily constructed by combining switching devices such as FET devices.

In the present embodiment, the direct-current voltage source Vx outputs constant voltage of 7V so that the driving voltage applied to the non-selected electron-emitting devices in FIG. 9 is lower than the electron-emitting threshold value Vth.

The controller 1703 controls the operations of the respective components so that appropriate display is made based on image signals inputted from an external device, by issuing various control signals Tscan, Tsft and Tmry to the respective components, based on the synchronizing signal Tsync from the synchronizing-signal separator 1706.

The synchronizing-signal separator 1706 is easily constructed by using a synchronizing-signal component (filter) circuit for filtering the NTSC signal-inputted from an external device. As it is well known, the synchronizing signal separated by the synchronizing-signal separator 1706 includes a vertical synchronizing signal, however, the synchronizing signal is represented as the signal Tsync, for the sake of convenience of explanation. On the other hand, a luminance signal component separated from the TV signal and inputted into the shift register 1704 is represented as DATA signal.

The shift register 1704 performs serial/parallel conversion on the DATA signal which is sequentially and serially inputted, by one line of an image. The shift register 1704 operates based on the control signal Tsft from the controller 1703. In other words, the control signal Tsft works as a shift clock for the shift register 1704.

The serial/parallel converted data for one image line is outputted from the shift register 1704, as n signals Id1 to Idn, into the line memory 1705.

The line memory 1705 is a storage device for storing data for one image line for a necessary period. The signals Id1 to Idn are inputted into the line memory 1705, in accordance with the control signal Tmry from the controller 1703. The stored contents are outputted as signals I'd1 to I'dn into the modulating-signal generator 1707.

The modulating-signal generator 1707 is a signal source for appropriately modulating the drive signals to the respective electron-emitting devices, in accordance with the image data I'd1 to I'dn. The output signals from the modulating-signal generator 1707 are applied through the terminals Doy1 to Doyn to the electron-emitting devices in the display panel 1701.

As described in FIG. 9, the electron-emitting device of the present invention has the following characteristics with respect to the emission current Ie. That is, as it is from the graph showing the emission current Ie, there is a clear threshold voltage Vth (8V for the device of the present embodiment) in electron emission, and only when the value of applied voltage is equal to the threshold Vth or higher, electron emission occurs.

Further, with respect to the voltage value of the threshold Vth or higher, the emission current Ie varies in accordance with the change of voltage as shown in the graph. Note that changing the structure of the electron-emitting device and manufacturing method may change the value of the threshold voltage Vth and the manner of change of the emission current.

In any way, it is apparent that in a case where voltage in the form of pulse-output is applied to the electron-emitting device, if the voltage is lower than the threshold voltage (8V), electron-emission does not occur, but electron-beams are outputted if the voltage is equal to the threshold voltage (8V) or higher.

The functions of the respective components in FIG. 15 are as described above. Next, the operation of the display panel 1701 will be described in detail with reference to FIGS. 16 to 18, prior to description of the entire operation.

For the convenience of illustration, the number of pixels of the display panel is 36 (6×6 (m=n=6)), however, the number of pixels in practical use of the display panel 1701 may be greater.

FIG. 16 shows an electron source having a 6×6 matrix-wired electron-emitting devices. In this example, the respective devices are identified by (X,Y) coordinates such as D(1,1), D(1,2) and D(6,6).

Upon displaying an image by driving the electron source, the display image is formed by line-sequential manner, i.e., the image is displayed by one line parallel to the axis X in FIG. 16 at a time. To drive the six electron-emitting devices corresponding to one line of the image, output of 0(V) is applied to one of terminals Dx1 to Dx6 of the line of the electron-emitting devices corresponding to the display image line, while outputs of 7(V) are applied to the other terminals. In synchronization with this operation, modulating signals are applied to the respective terminals Dy1 to Dy6 in accordance with an image pattern of the display image line.

Next, an example where an image pattern as shown in FIG. 17 is displayed will be described.

Figure 18:
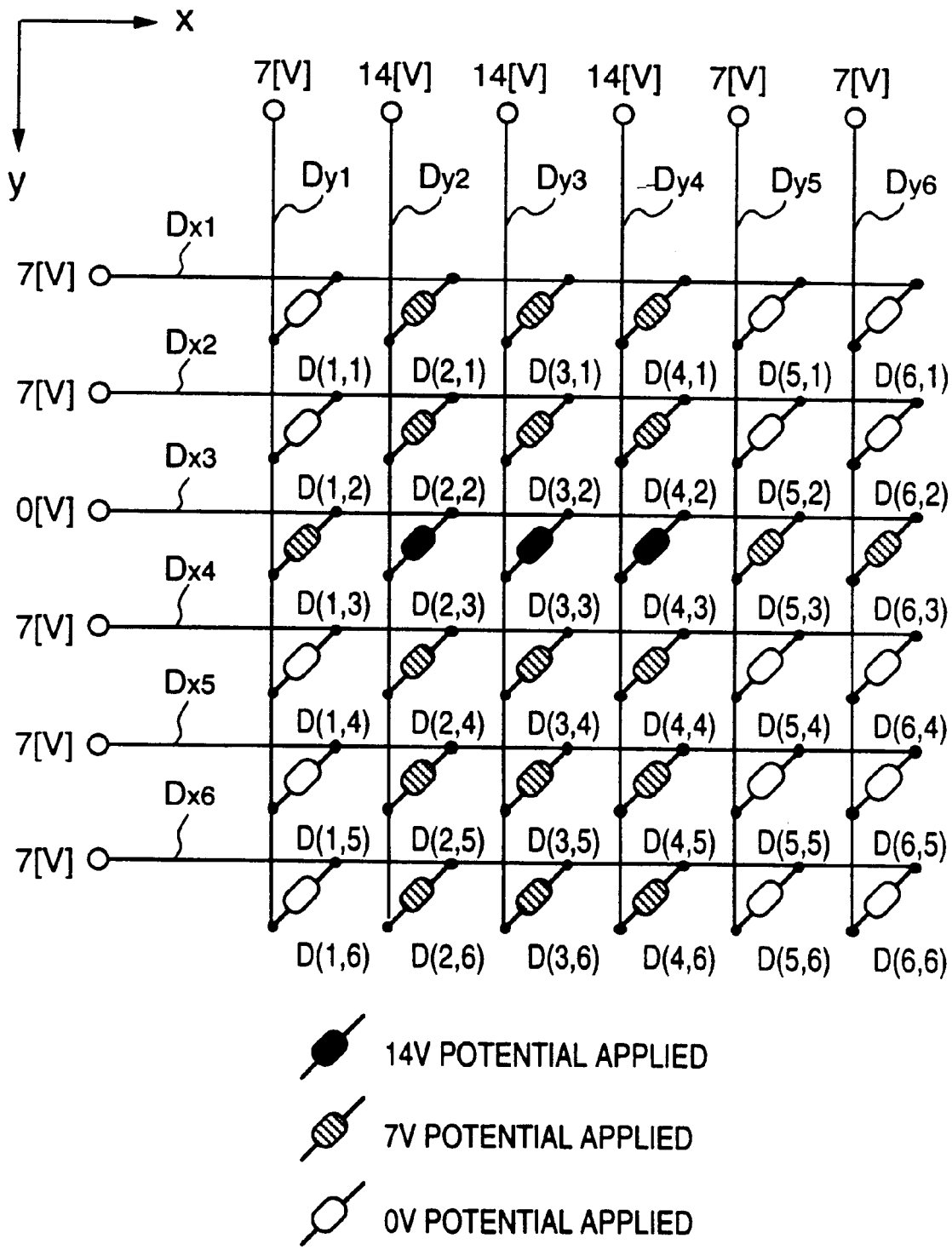
FIG. 18 is an explanatory view showing a driving method for the sample image in FIG. 17.

FIG. 18 shows voltage application to the electron-emitting devices when image display based on the third line of the image pattern in FIG. 17 is displayed. FIG. 18 also shows application voltage values during light emission corresponding to the third line. The electron-emitting devices D(2,3), D(3,3) and D(4,3) receive voltage of 14V higher than the threshold voltage value 8V (represented as solid-black devices in FIG. 18), and outputs electron beams. On the other hand, the other electron-emitting devices than the above devices D(2,3), D(3,3) and D(4,3) receive voltage of 7V (represented as hatched devices) or 0V (represented blank devices). As the application voltage values are lower than the threshold value 8V, these electron-emitting devices do not output electron beams.

The other lines of the electron-emitting devices are driven in accordance with the image pattern in FIG. 17 in the same manner. Thus, sequentially driving the lines of the electron-emitting devices sequentially from the first line attains display of one image, and repeating this line-sequentially display operation at 60 images per second enables image display without flicker.

Note that regarding half-tone image display, although detailed explanation is omitted here, a half-tone image can be displayed by, e.g., varying pulsewidth of voltages to be applied to the electron-emitting devices.

Figure 19:
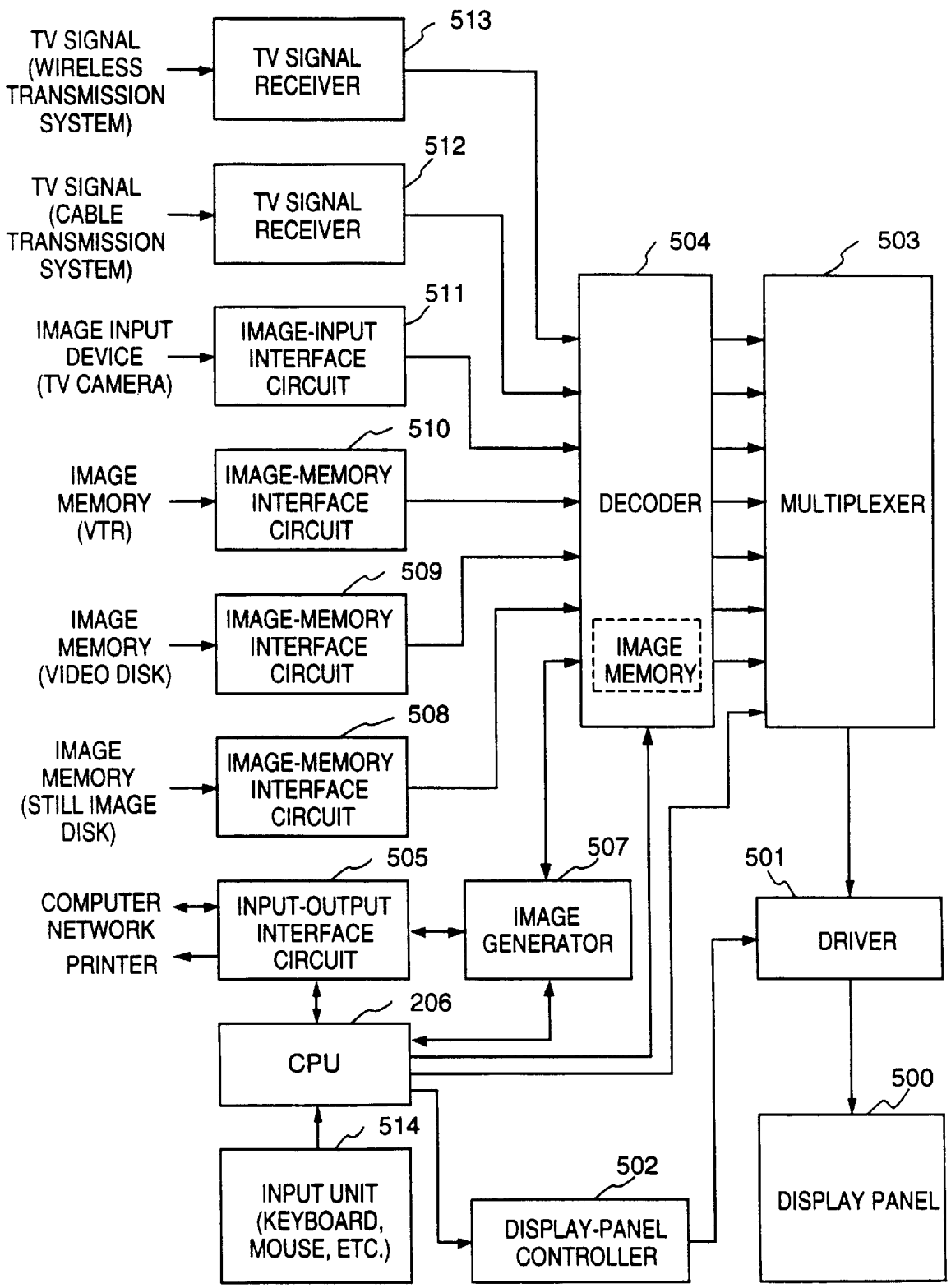
FIG. 19 is a block diagram showing the construction of a multifunction display device, according to the embodiment having a display panel using the surface-conduction emission type electron-emitting devices as an electron-beam source.
Figure 20:
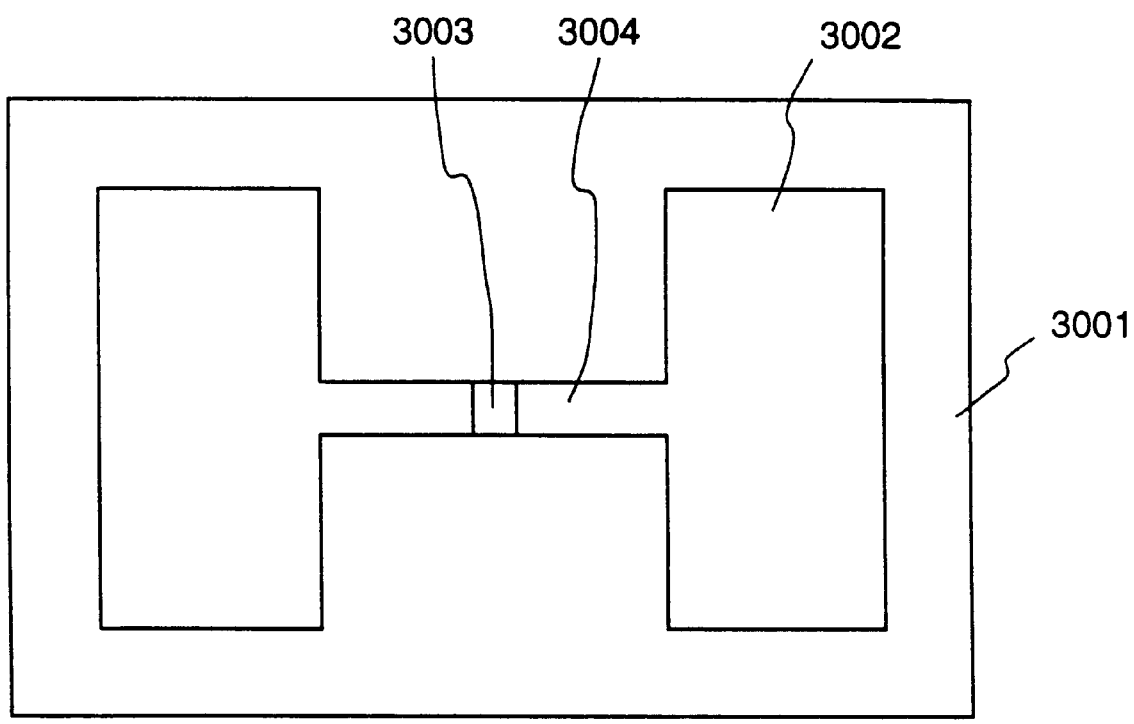
FIG. 20 is a plan view showing the structure of the electron-emitting device by M. Hartwell and C. G. Fonstad as a typical surface-conduction emission type electron-emitting device.

FIG. 19 shows an example of a multifunction image display device which can display image information supplied from various image-information sources such as TV broadcasting, on a display panel using the electron source having the above-described surface-conduction emission type electron-emitting devices.

In FIG. 19, numeral 500 denotes a display panel; 501, a driver for the display panel 500; 502, a display controller; 503, a multiplexor; 504, a decoder; 505, an input-output interface circuit; 506, a CPU; 507, an image generator; 508 to 510, image-memory interface circuits; 511, image-input interface circuit; 512 and 513, TV signal receivers; and 514, an input unit.

Note that in case of reception of image signals including both video information and audio information such as TV signals, the display apparatus reproduces sound while displaying video images. In this example, the explanation of circuits and speaker(s) for the reception, separation, reproduction, processing, storing etc. of audio information will be omitted.

Hereinbelow, the functions of the respective components will be described along with the flow of image signal.

The TV signal receiver 513 receives TV image signals transmitted via a wireless transmission system such as electric wave transmission or space optical transmission. The standards of TV signal to be received are not limited to the NTSC standards. The TV signals are transmitted in accordance with, e.g., NTSC standards, PAL standards, or SECAM standards. Further, a TV signal having scanning lines more than those in the above television standards (e.g., so-called high-quality TV such as MUSE standards) is a preferable signal source for utilizing the advantageous feature of the display panel applicable to a large display screen and numerous pixels. The TV signal received by the TV signal receiver 513 is outputted to the decoder 504.

The TV signal receiver 512 receives the TV signal transmitted via a cable transmission system such as a coaxial cable system or a optical fiber system. Similar to the TV signal receiver 513, the standards of the TV signal to be received are not limited to the NTSC standards. Also, the TV signal received by the TV signal receiver 512 is outputted to the decoder 504.

Further, the image input I/F circuit 511 receives image signals supplied from image input devices such as a TV camera or an image reading scanner. Also, the read image signal is outputted to the decoder 504.

The image memory I/F circuit 510 inputs image signals stored in a video tape recorder (VTR). Also, the input image signals are outputted to the decoder 504.

The image memory I/F circuit 509 inputs image signals stored in a video disk. Also, the input image signals are outputted to the decoder 504.

The image memory I/F circuit 508 inputs image signals from a device holding still-picture image data (e.g., so-called still-picture disk). Also, the input still-picture image data are outputted to the decoder 504.

The input-output I/F circuit 505 connects the display apparatus to an external computer, a computer network or an output device such as a printer. The input-output I/F circuit 505 operates for input/output of image data, character information and figure information, and for input/output of control signals and numerical data between the CPU 506 and an external device.

The image generator 507 generates display image data based on image data, character information and figure information inputted from an external device via the input-output I/F circuit 505 or image data, character information or figure information outputted from the CPU 506. The image generator 507 has circuits necessary for image generation such as a rewritable memory for storing image data, character information and figure information, a ROM in which image patterns corresponding to character codes are stored and a processor for image processing.

The display image data generated by the image generator 507 is outputted to the decoder 504, however, it may be outputted to the external computer network or the printer via the input-output I/F circuit 505.

The CPU 506 controls the operation of the display apparatus and operations concerning generation, selection and editing of display images.

For example, the CPU 506 outputs control signals to the multiplexor 503 to appropriately select or combining image signals for display on the display panel. At this time, it generates control signals to the display panel controller 502 to appropriately control a display frequency, a scanning method (e.g., interlaced scanning or non-interlaced scanning) and the number of scanning lines in one screen.

Further, the CPU 506 directly outputs image data, character information and figure information to the image generator 507, or it accesses the external computer or memory via the input-output I/F circuit 505, to input image data, character information and figure information.

Note that the CPU 506 may operate for other purposes; e.g., like a personal computer or a word processor, it may directly generate and process information.

Otherwise, the CPU 506 may be connected to the external computer network via the input-output I/F circuit 505, to cooperate with an external device in, e.g., numerical calculation.

The input unit 514 is used for a user to input instructions, programs and data into the CPU 506. The input unit 514 can comprise various input devices such as a joy stick, a bar-code reader or a speech recognition device as well as a keyboard and a mouse.

The decoder 504 converts various image signals, inputted from the image generator 507, the TV signal receiver 513 and the like, into three-primary-color signals, or luminance signals and I and Q signals. As indicated with a dotted line in FIG. 26, the decoder 504 preferably comprises an image memory, since reverse-conversion of TV signals based on standards of numerous scanning lines, such as MUSE standards, requires an image memory. Further, the image memory enables the decoder 504 to easily perform image processing such as thinning, interpolation, enlargement, reduction and synthesizing, and editing, in cooperation with the image generator 507 and the CPU 506.

The multiplexor 503 appropriately selects a display image based on a control signal inputted from the CPU 506. That is, the multiplexor 503 selects a desired image signal from reverse-converted image signals inputted from the decoder 504, and outputs the selected image signal to the driver 501. In this case, the multiplexor 503 can realize so-called multiwindow television, where the screen is divided into plural areas and plural images are displayed at the respective image areas, by selectively switching image signals within display period for one image frame.

The display panel controller 502 controls the driver 501 based on control signals inputted from the CPU 506.

Concerning the basic operations of the display panel, the display panel controller 502 outputs a signal to control the operation sequence of the power (not shown) for driving the display panel to the driver 501.

Further, concerning the driving of the display panel, the display panel controller 502 outputs signals to control a display frequency and a scanning method (e.g., interlaced scanning or non-interlaced scanning) to the driver 501.

In some cases, the display panel controller 501 outputs control signals concerning image-quality adjustment such as luminance, contrast, tonality and sharpness to the driver 501.

The driver 501 generates drive signals applied to the display panel 500. The driver 501 operates based on image signals inputted from the multiplexor 503 and control signals inputted from the display panel controller 502.

The functions of the respective components are as described above. The construction shown in FIG. 26 can display image information inputted from various image information sources on the display panel 500.

That is, various image signals such as TV signals are reverse-converted by the decoder 504, and appropriately selected by the multiplexor 503, then inputted into the driver 501. On the other hand, the display panel controller 502 generates control signals to control the operation of the driver 501 in accordance with the display image signals. The driver 501 applies drive signals to the display panel 500 based on the image signals and the control signals.

Thus, images are displayed on the display panel 500. The series of these operations are made under control of the CPU 506.

As the present display apparatus uses the image memory included in the decoder 504, the image generator 507 and the CPU 506, it can not only display images selected from plural image informations, but also perform image processing such as enlargement, reduction, rotation, movement, edge emphasis, thinning, interpolation, color conversion, resolution conversion, and image editing such as synthesizing, deletion, combining, replacement, insertion, on display image information. Although not especially described in the above embodiments, similar to the image processing and image editing, circuits for processing and editing audio information may be provided.

The present display apparatus can realize functions of various devices, e.g., a TV broadcasting display device, a teleconference terminal device, an image editing device for still-pictures and moving pictures, an office-work terminal device such as a computer terminal or a word processor, a game machine etc. Accordingly, the present display apparatus has a wide application range for industrial and private use.

Figure 26:
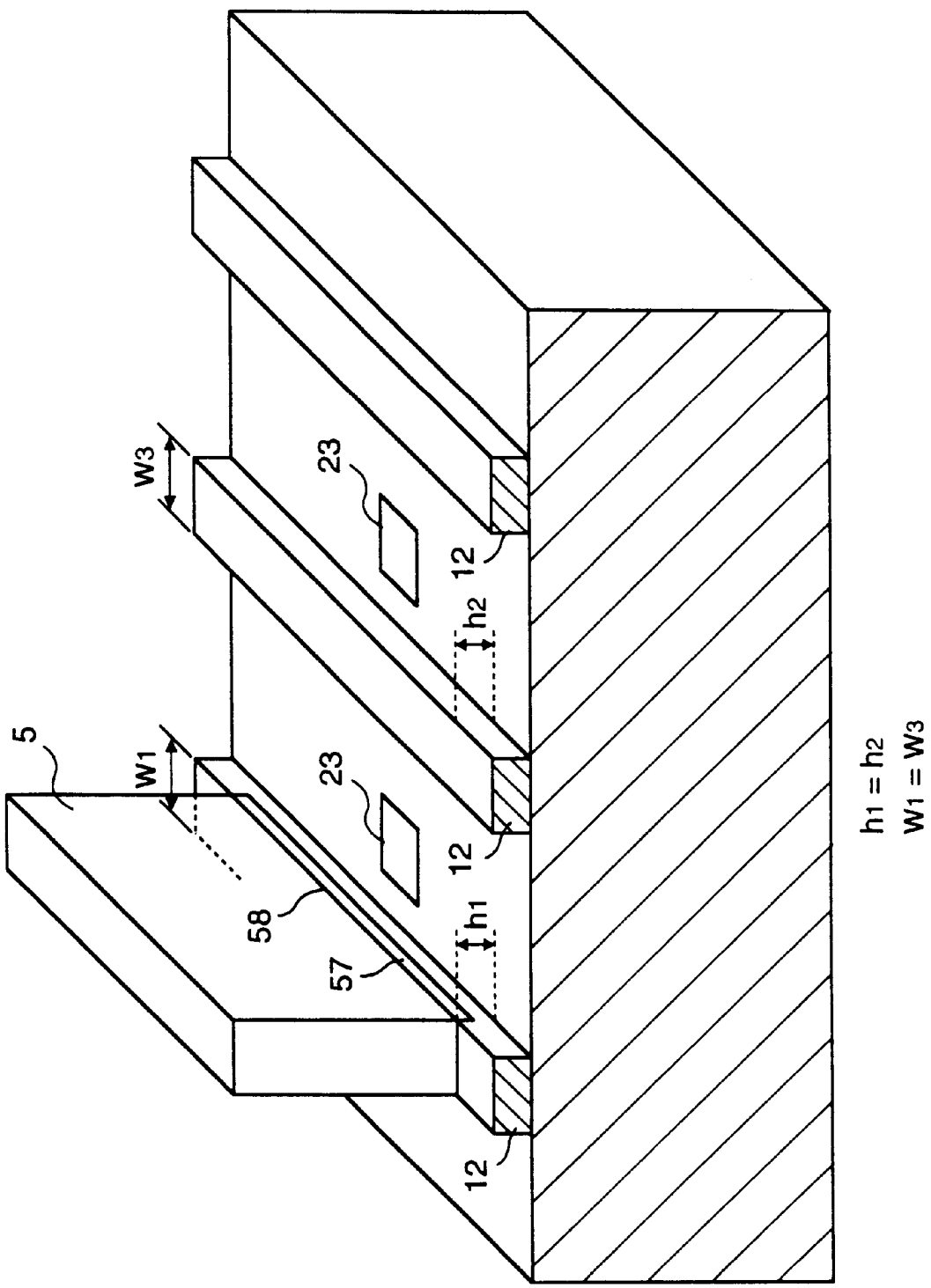
FIG. 26 is a perspective view showing the structure of a conductive connection member of the image forming apparatus in FIG. 2.

Note that FIG. 26 merely shows one example of the construction of the display apparatus using the display panel having an electron beam source comprising the surface-conduction emission type electron-emitting devices of the present invention, but this does not pose any limitation on the present invention. For example, in FIG. 26, circuits unnecessary for some use may be omitted. Contrary, components may be added for some purpose. For example, if the present display apparatus is used as a visual telephone, preferably, a TV camera, a microphone, an illumination device, a transceiver including a modem may be added.

In the present display apparatus, as the display panel having the electron beam comprising the surface-conduction emission type electron-emitting devices can be thin, the depth of the overall display apparatus can be reduced. In addition, as the display panel can be easily enlarged, further it has high luminance and wide view angle, the present display apparatus can display vivid images with realism and impressiveness.

Note that the construction as described in FIG. 19 can be applied to the following second to eighth embodiments.

<Second Embodiment>

Figure 14:
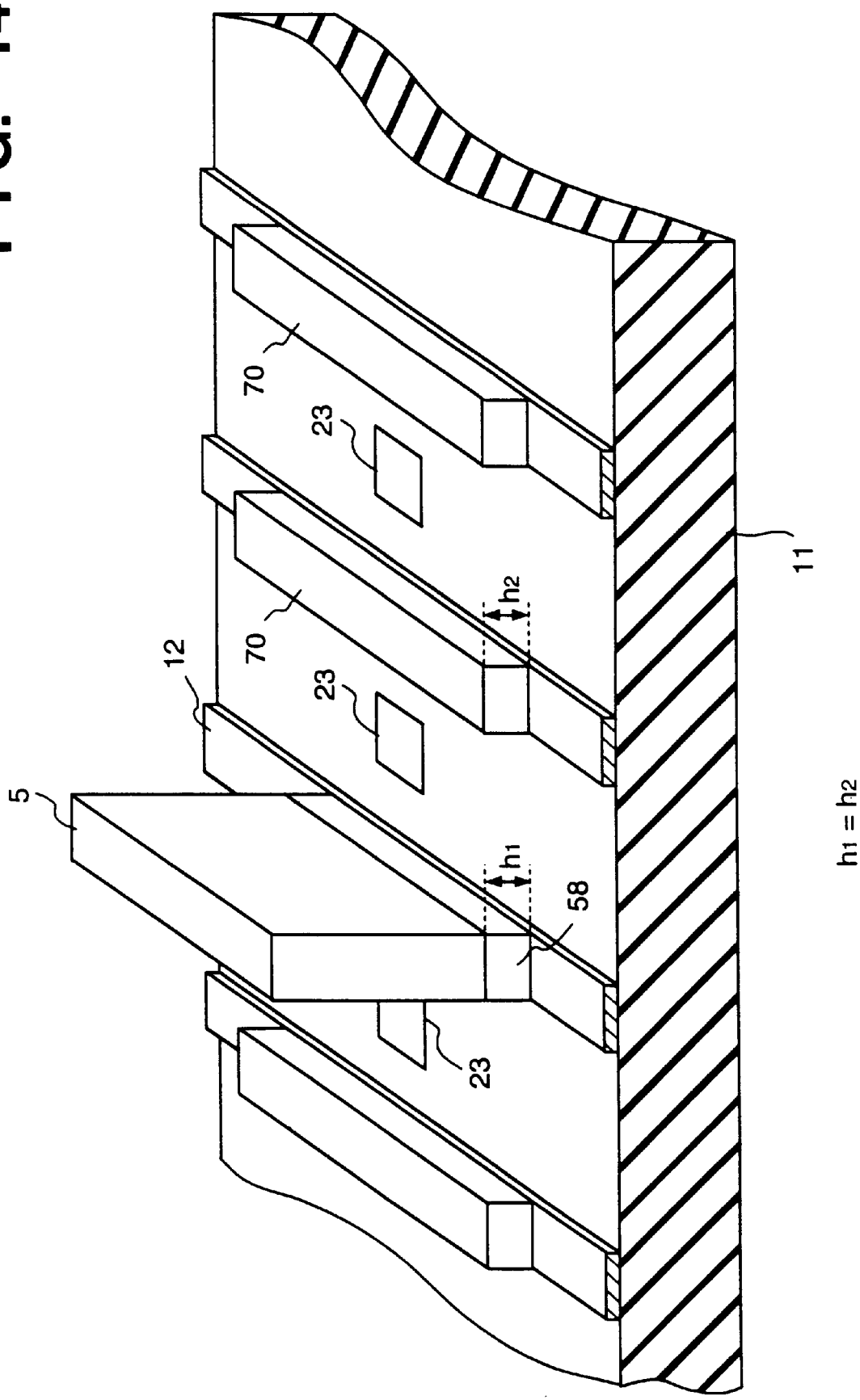

FIG. 14 is a perspective view showing the arrangement of spacers according to the second embodiment, in which the form of the conductive member on the row-direction wiring electrodes 12 on the insulating substrate 11 is different from that of the first embodiment. In this embodiment, the row-direction wiring electrodes 12 have a width of 400 μm and a thickness of 40 μm.

The second embodiment also realizes color-image display without disturbance of electron trajectories and with excellent color reproducibility.

In the present embodiment, upon forming the conductive connection member 58, regarding the row-direction wiring electrode 12 where the spacer 5 is provided, the conductive connection member 58 is formed between the spacer 5 and the electrode 12; and regarding the row-direction wiring electrode 12 where the spacer 5 is not provided, the conductive member 70 having the same shape of the conductive connection member 58 is formed on the electrode 12.

This reduces the amount of conductive connection material to be applied between the row-direction wiring electrode 12 and the spacer 5, thus enables mass production.

<Third Embodiment>

The present invention can be applied to any of cold cathode electron-emitting devices other than surface-conduction emission type electron-emitting devices. For example, an electron-emitting device having a pair of electrodes opposing to each other, as disclosed in Japanese Patent Application Laid-Open No. 63-274047 by the present applicant, is known.

Figure 25:
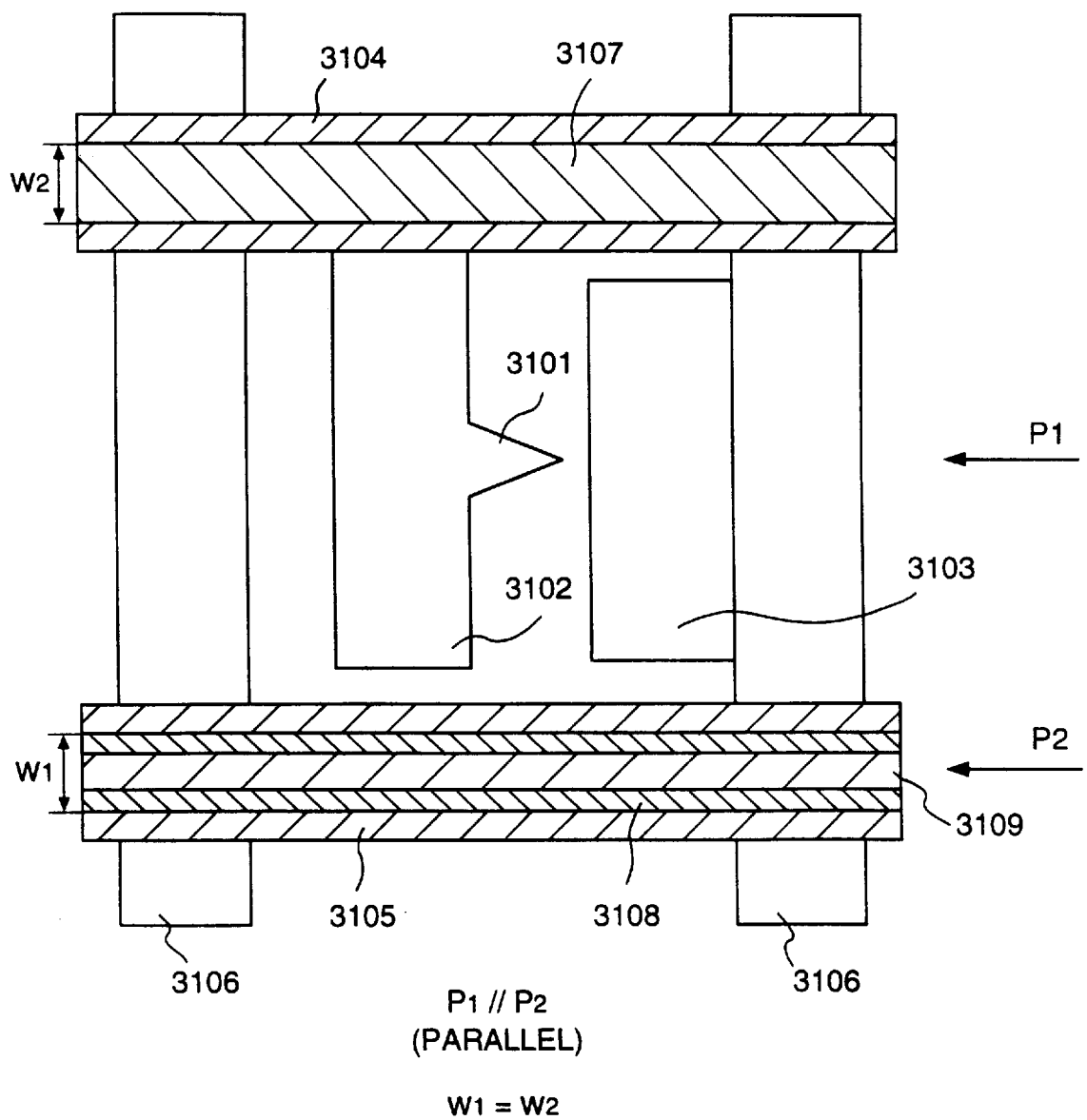
FIG. 25 is a plan view showing the structure of the electron-emitting device according to a third embodiment.

FIG. 25 is a plan view showing the structure of the electron-emitting device in an FE type electron source. In FIG. 25, numeral 3101 denotes an electron-emitting portion; 3102 and 3103, device electrodes; 3104 and 3105, row-direction wiring electrodes; 3106, column-direction wiring electrodes; 3107, a conductive member; 3108, a conductive connection member; and 3109, a spacer. The conductive spacer 3109 is provided on the row-direction wiring electrode 3104 with the conductive connection member 3108. The conductive member 3107 is provided to avoid asymmetry between an electric potential in a direction (column direction) vertical to a voltage-application direction and an electric potential including the electron-emitting portion 3101, vertical to the substrate and parallel to the row-direction wiring electrode 3104, due to the conductive connection member 3108.

Note that the width ($w_1$) of the conductive connection member 3108 and the width ($w_2$) of the conductive member 3107 are the same. Similar to the previous embodiments, the heights of these members are set to $h_1=h_2$ (not shown in FIG. 25). In FIG. 25, numeral $P_1$ denotes a direction in which the current flows; and $P_2$, a direction in which the spacer 3109 extends. The directions $P_1$ and $P_2$ are parallel to each other.

Further, the present invention can be applied to an electron source having any of other arrangements of electron-emitting devices than the simple matrix arrangement. For example, in an image forming apparatus as disclosed in Japanese Patent Application Laid-Open No. 2-257551 by the present applicant, control electrodes may be employed for selecting surface-conduction emission type electron-emitting devices.

Further, according to the present invention, the above-described image forming apparatus is not limited to a display device, but it can be used in an optical printer, usually comprising an electrostatic drum, an LED and the like, as a line light-emitting source substituting for the LED. In this case, by selecting the m row-direction wiring electrodes and n column-direction wiring electrodes appropriately, the apparatus can be used as a two-dimensional light-emitting source as well as the line light-emitting source.

Furthermore, according to the present invention, the present image forming apparatus can be applied to a device such as an electron microscope where an object that receives electron beams emitted from an electron source is foreign material. Accordingly, the present invention can be applied to an electron-beam generating apparatus which does not specifies an electron-receiving member.

In the image display apparatus according to the above embodiment, the spacer (3109) having a semiconductive film on its surface is provided on one of wiring electrodes (3105), and to make electrical connection between the semiconductive film and the wiring electrode and to hold the spacer, conductive connection member (3108) is provided on the wiring electrode between the spacer and the wiring electrode. In another one of the row-direction wiring electrodes (3104) where the spacer is not provided, to obtain the same height as that of the row-direction wiring electrode (3105) with the spacer, the conductive member (3107) having the same shape of the conductive connection member (3108) is provided. This prevents the shift of electron-beam irradiated position of a fluorescent member, to an adjacent image position, and prevents luminance degradation, thus enables display of vivid images.

Further, in an electron generating apparatus having a plane multi-device electron source, similar advantages can be obtained.

<Fourth Embodiment>

Next, a fourth embodiment of the present invention will be described with reference to FIG. 26. In the manufacturing process according to this embodiment, the above-described printing step is divided into several steps to form a concave portion on the wiring electrodes for formation of conductive connection members.

Step e: Ag electrodes as the row-direction wiring electrodes 12 are formed by screen-printing, on the device electrodes 16 and 17. The screen-printing is performed twice, i.e., printing operations (a) and (b), using different screen masks at respective printing operations. The formed wiring-electrodes 12 have a concave portion 57 for application of the conductive connection member 58 having a thickness of 20 μm.

Figure 30B:
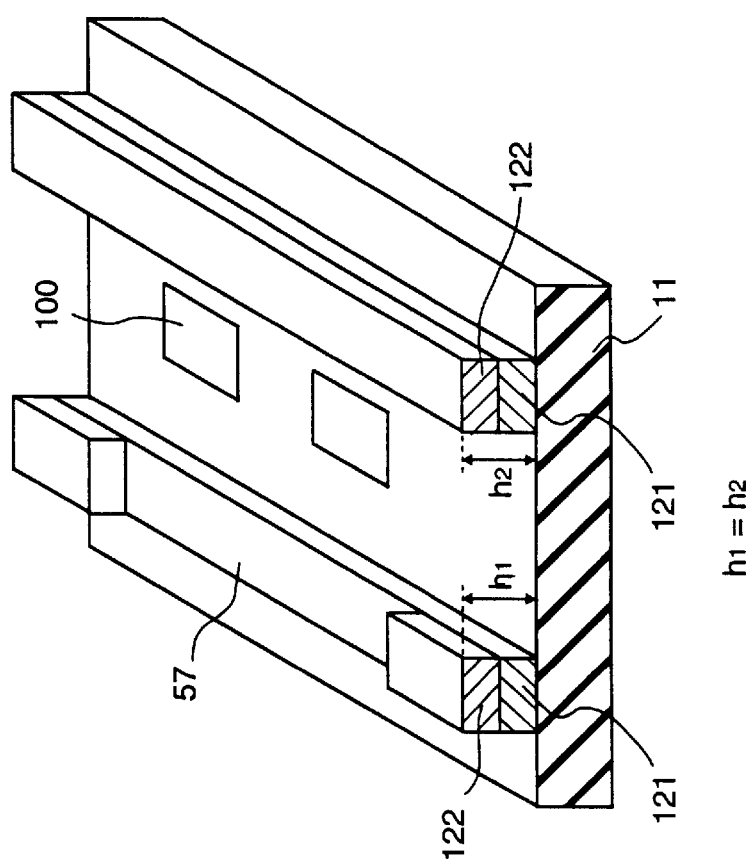
FIGS. 30A and 30B are perspective views respectively showing a manufacturing process according to the fourth embodiment.

The step e having the two printing operations will be described in detail with reference to FIG. 30. In FIG. 30, reference numeral 100 denotes electron-emitting portions; 11, the insulating substrate; 121 to 122, row-direction wiring electrodes; and 57, a concave portion for forming the conductive connection member 58.

Figure 30A:
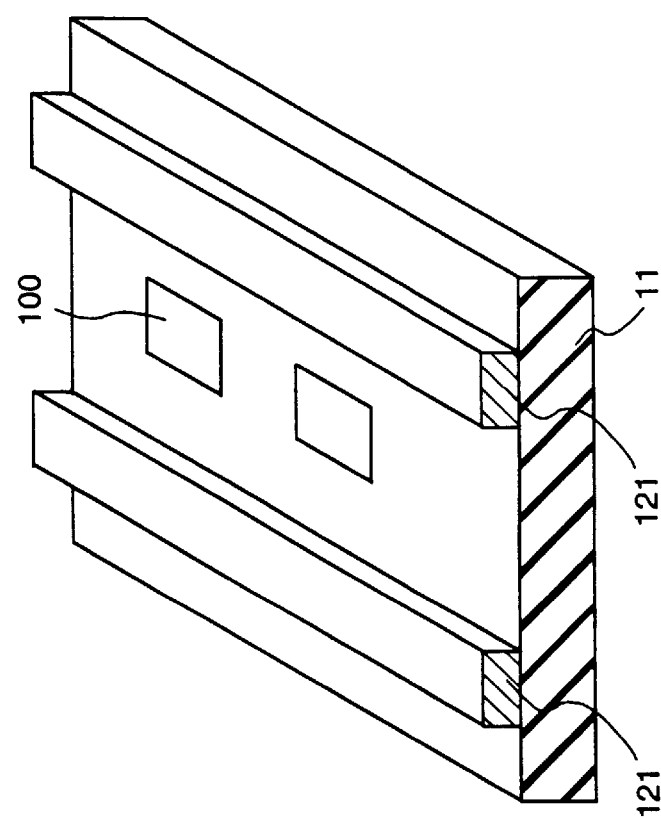

Printing operation (a): On the insulating substrate 11, silver paste is applied to the row-direction wiring electrodes 121. In FIG. 30A, the concave portion is provided on the left electrode 121, but it is not provided on the right electrode 121. First, the silver paste is applied to the left row-direction wiring electrode 121 such that the concave portion 57 for the conductive connection member 58 is formed. In this state, the portion where the silver paste has been applied is sintered at 150° C. for 30 minutes. Next, the silver paste is also applied to the right row-direction wiring electrode 121 where the spacer is not held.

Printing operation (b): The silver-paste applied portions 122 are sintered at 580° C. for 15 minutes.

In this embodiment, the width of the row-direction wiring electrodes is 300 μm; the thickness of the row-direction wiring electrodes, 20 μm; and the thickness of the portions 122, 20 μm, such that the height ($h_1$) of the row-direction wiring electrode 121 where the spacer is provided and the height ($h_2$) of the row-direction wiring electrode 121 where the spacer is not provided are the same.

Next, the connection of the row-direction wiring electrode 12, having the concave portion 57, as the feature of this embodiment, to the spacer 5 will be described in detail with reference to FIG. 26.

In FIG. 26, the spacer 5 is provided at the concave portion 57 made at a part of the row-direction wiring electrode 12 via the conductive connection member 58. The measurements are set such that the height of the upper surface of the conductive connection member 58 ($h_1$ in FIG. 26) and that of the upper surface of the row-direction wiring electrode 12 without the spacer 5 ($h_2$ in FIG. 26) are the same. This renders the electric-potential distribution on the spacer surface and that in the space above the row-direction wiring electrode 12 without the spacer 5 equal to each other. That is, even if the spacer 5 is provided via the conductive connection member 58 on a row-direction wiring electrode 12, the electro-optical characteristic at the row-direction wiring electrode can be the same as that at the row-direction wiring electrode 12 without the spacer 5. Accordingly, since electron beams emitted by any of the electron-emitting portions 23 traverse similar trajectories, the conventional problems such as the shift of light-emitting points, the luminance degradation and the change of color around the spacer can be prevented. In this embodiment, to optimize this feature, the condition of the widths of the row-direction wiring electrodes, $w_1=w_3$ ($w_1$: width of the conductive connection member 58, $w_3$: width of row-direction wiring electrode 12), is added to the condition $h_1=h_2$.

Next, the manufacturing will be described in detail.

In the present embodiment, the conductive connection member 58, which holds the spacer 5 and makes electrical connection with the spacer 5, is formed by dispersing Au-plated soda-lime glass balls, as filler, in the flit-glass paste, and applying and sintering the paste. In this example, the soda lime balls have an average diameter of 8 μm. As the conductive layer of the filler surface, a Ni film with a thickness of 0.1 μm, as a base, and an Au film with a thickness of 0.04 μm, on the base, are sequentially formed by electroless plating. The paste to be applied is formed by mixing the conductive filler at 30 wt % with respect to the flit-glass paste, and further adding a binder to the mixture.

Next, the conductive flit-glass paste is applied by a dispenser, to the concave portion 57 of the row-direction wiring electrode 12 on the electron source 1 side, while to the end of the spacer 5 on the face plate 3 side. Then, the spacer 5 is aligned with the concave portion 57 on the electron source 1 side, while with the black conductive material 7b (with a width of 300 μm) on the face plate 3 side, and connected portions are sintered in the atmosphere at 400° C. to 500° C. for 10 minutes or longer. This fix-connects the electron 1, the black conductive material 7b and the spacer 5b, and obtains electrical connection of the members. In this embodiment, on the electron source 1 side, the difference between the upper surface of the conductive connection member 58 and that of the row-direction wiring electrode 12 where the spacer 5 is not provided is within 5 μm.

In the present embodiment, the material of the conductive connection members 58 and that of the row-direction wiring electrodes 12 are selected such that the conductivity of the conductive connection members 58 and that of the row-direction wiring electrodes 12 are substantially equal to each other. This equalizes the electric characteristics of the row-direction wiring electrode 12 having the concave portion 57 and the row-direction wiring electrode 12 without the concave portion 57.

At the same time, the conductivity of the semiconductive film on the spacer surface is set such that the electric resistance in the heighthwise direction of the spacer 5 (resistance between the row-direction wiring electrode and the accelerating electrode) is 10,000 times larger than that of the row-direction wiring electrode or the conductive connection member 58. This setting of the resistance on the spacer 5 surface can reduce voltage degradation which occurs at the conductive connection members 58 and the row-direction wiring electrodes 12 due to current from the spacers 5. In other words, the accelerating voltage can be completely applied between the accelerating electrode and the conductive connection members (i.e., the both ends of the spacers 5).

These two operations equalize the electric-potential distribution on the spacer surface and that in the space above the row-direction wiring electrode without the spacer. That is, even if the spacer 5 is provided via the conductive connection member 58 on the row-direction wiring electrode 12, the electro-optical characteristic at the row-direction wiring electrode can be the same as that at the row-direction wiring electrode without the spacer 5. Accordingly, since electron beams emitted by any of the electron-emitting portions 23 traverse similar trajectories, the conventional problems such as the shift of light-emitting points, the luminance degradation and the change of color around the spacer can be prevented.

Note that in the present embodiment, the spacer 5, the electron source 1 and the face plate 3 are connected simultaneously, however, the connection may be made separately. Further, to avoid deformation of the paste as the material of the conductive connection member 58 by a considerably-great amount upon formation of the connection member 58, temporary sintering may be performed before connecting the conductive connection member 58 with the spacer 5, at a temperature lower than a temperature of sintering after the connection.

At this time, a two-dimensional array of light spots at equal intervals is formed, including emitted-light spots of electrons from the electron-emitting devices 15 near the spacers 5, which attains vivid color image display with excellent color reproducibility. This indicates that the spacers 5 do not cause the disturbance of electric field that may influence the electron trajectories.

In the present embodiment, the concave portions are formed at the row-direction wiring electrodes, however, in accordance of necessity, the concave portions may also be formed at the other electrodes provided on the electron source, e.g., a wiring pulled-out portion if such portion is provided around the electron source, a support frame connection electrode if a semiconductive film is provided at the support frame 4 for electrical connection, and control electrodes if provided for control-voltage application. The concave portions can be formed at any of these electrodes for forming the holding members without disturbing the electron trajectories around the concave portions.

FIG. 31 shows another example of the present embodiment, where the concave portion is formed with respect to the entire wiring electrode. In FIG. 31, numeral 12 denotes the row-direction wiring electrode; 58, the conductive connection member; 5, spacer; and 15, electron-emitting devices.

In this example, on the assumption that the height of the conductive connection member 58 is $h_1$ and that of the row-direction wiring electrode 12 without the spacer is $h_2$, the condition of the heights is set to $h_1=h_2$. Further, on the assumption that the width of the conductive connection member 58 is $w_1$ and that of the row-direction wiring electrode 12 without the spacer is $w_2$, the condition of the widths is set to $w_1=w_2$. Finally, on the assumption that the direction in which current flows at the electron-emitting device is P1 and the direction in which the spacer 5 extends (i.e., the lengthwise direction of the row-direction wiring electrode 12) is P2, the directions are set to be parallel to each other.

In this example, the printing step for formation of conductive connection members 58 is divided into three printing operations. The height of the row-direction wiring electrode where the spacer 5 is not provided is 30 μm; and that of the row-direction wiring electrode where the spacer 5 is provided, 10 μm. The image forming apparatus is manufactured in accordance with the steps a to h except the Step e, and as a result, advantages the same as those in the former example can be obtained.

<Fifth Embodiment>

Next, a modification to the part of the fourth embodiment will be described as a fifth embodiment.

Figure 27:
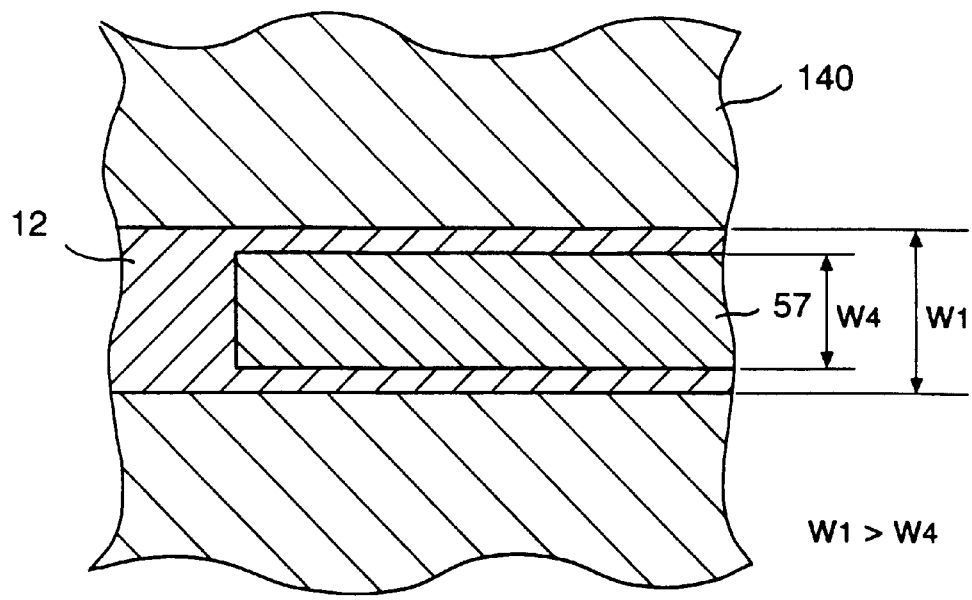
FIG. 27 is a plan view showing a convave portion 57 according to the fifth embodiment.

FIG. 27 is a partial plan view showing the row-direction wiring electrode 12 where the spacer is provided. The feature of this embodiment is that the width ($W_4$) of the concave portion 57 is narrower than the width $W_1$ of the row-direction wiring electrode 12. In FIG. 27, numeral 12 denotes the row-direction wiring electrode; 57, the concave portion; and numeral 140 denotes an insulating substrate on which the row-direction wiring electrodes 12 are formed. In the fifth embodiment, the width of the row-direction wiring electrode 12 is 400 μm; the width of the concave portion 57, 300 μm; the thickness of the row-direction wiring electrode 12, 60 μm; and that of the row-direction wiring electrode 12 at the concave portion 57, 10 μm.

Also in this embodiment, vivid color image display with excellent color reproducibility can be obtained.

In the fifth embodiment, as the side wall of the row-direction wiring electrode 12 surrounds the concave portion 57, upon forming the conductive connection member 58, the extrusion of the conductive connection member 58 can be prevented. In addition, as the spacer 5 is plugged into the row-direction wiring electrode 12, the mechanical strength at the connection portion is increased. This can provide atmospheric-pressure-proof structure with a small number of spacers.

<Sixth Embodiment>

Figure 28:
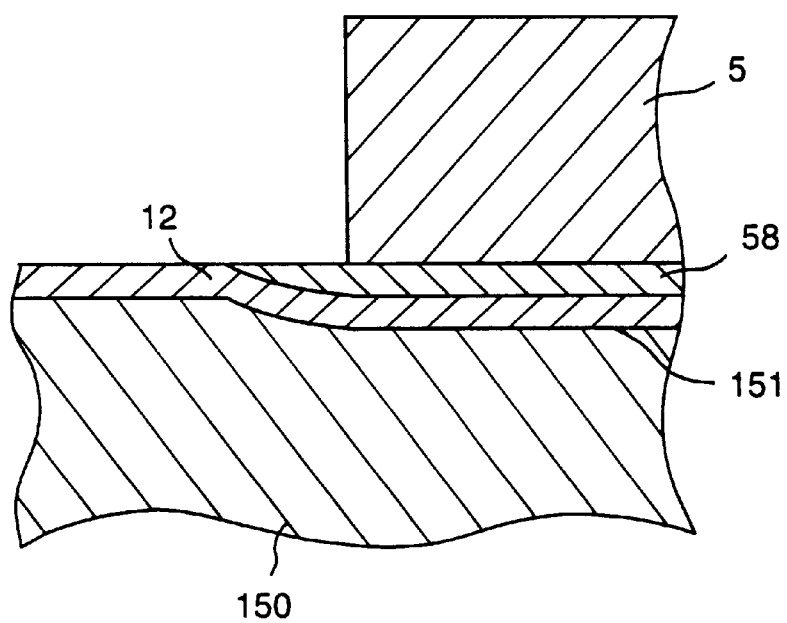
FIG. 28 is a cross-sectional view showing the structure of the conductive connection member of the image forming apparatus according to a sixth embodiment.

FIG. 28 shows the sixth embodiment of the present invention. In FIG. 28, numeral 150 denotes an insulating substrate; 151, a concave portion; 12, the row-direction wiring electrode; 58, the conductive connection member; 5, the spacer.

The sixth embodiment differs from the fourth and fifth embodiments in that the concave portion 151 is formed on the insulating substrate 150.

The concave portion 151 is formed by removing a portion of the insulating substrate 150 using a dicing saw. In this embodiment, the width of the concave portion 151 is 80 μm, and the depth is also 80 μm. Next, a pattern of the row-direction wiring electrodes is formed with silver paste by screen-printing. Further, the patterned silver paste is sintered at 58.0° C. for 15 minutes, thus the row-direction wiring electrodes 12 are formed on the insulating substrate 150. Next, the conductive connection members 58 and the spacers 5 in a similar manner to that of the fourth embodiment.

Also in the sixth embodiment, upon driving the image forming apparatus, a two-dimensional emission-light spot array at equal intervals is formed, which attains vivid color image display with excellent color reproducibility. Further, any disturbance of electric field that may influence the electron trajectories is not found.

Note that in the present embodiment, the row-direction wiring electrode where the concave portion 151 is not provided is formed on the insulating substrate 150, however, the insulating substrate 150 may have a groove for providing the entire row-direction wiring electrode. Further, the conductive connection member 58 may be formed by, first forming the concave portion 151 in the conductive substrate 150 with an even depth, then forming the row-direction wiring electrode 12 there, removing a part of the row-direction wiring electrode 12.

<Seventh Embodiment>

This embodiment shows an example using flat FE type electron-emitting devices in the fourth embodiment.

Figure 29:
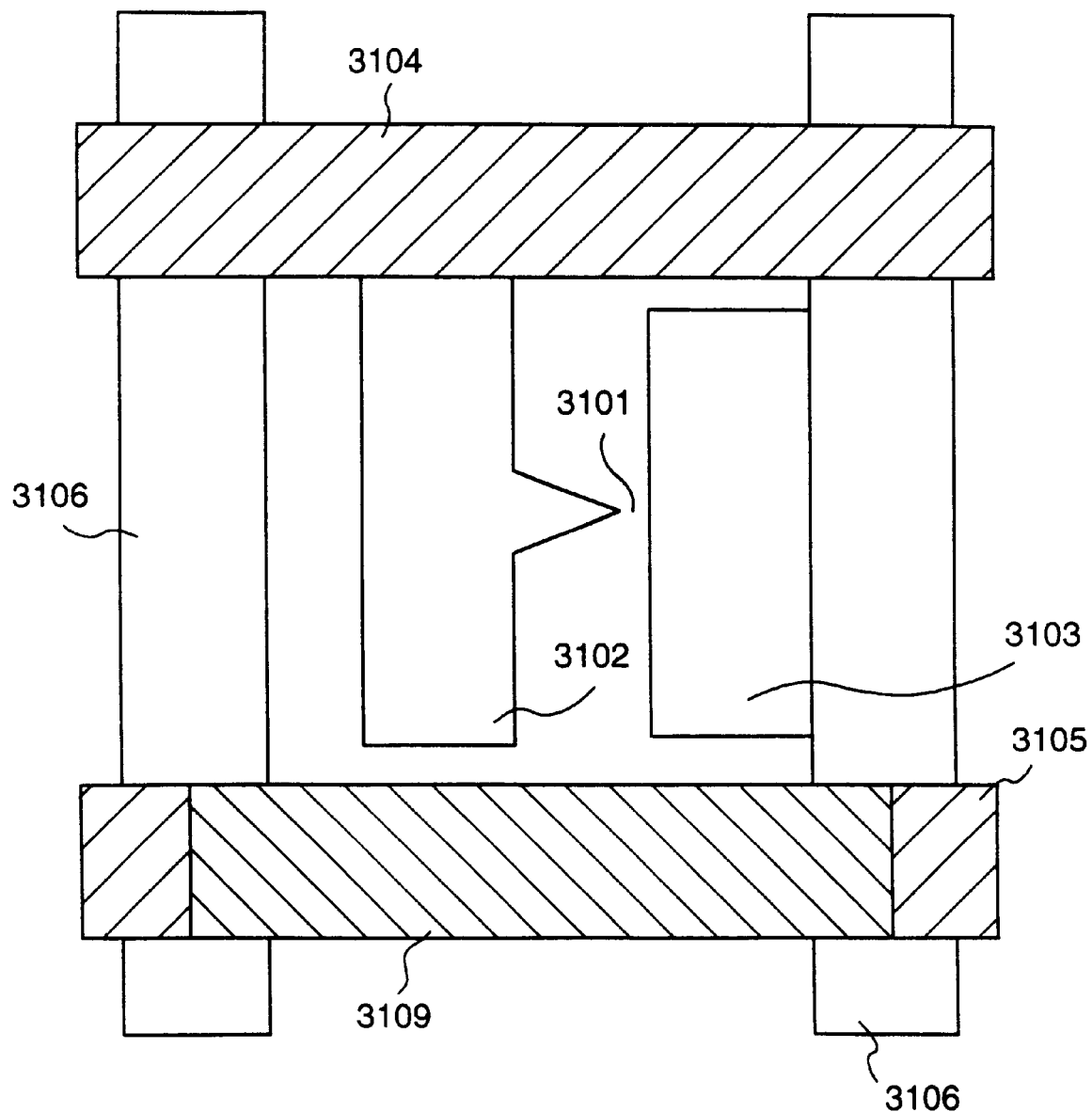
FIG. 29 is a plan view showing the structure of the electron-emitting device of the sixth embodiment.

FIG. 29 is a plan view showing a flat FE type electron-emitting source. In FIG. 29, numeral 3101 denotes an electron-emitting portion; 3102 and 3103, a pair of device electrodes for supplying a predetermined electric potential to the electron-emitting portion 3101; 3014 and 3015, row-direction wiring electrodes; 3106, a column-direction wiring electrode; and 3109, a spacer.

In this construction, the electron-emitting portion 3101 emits electrons from its sharp distal end when a predetermined voltage is applied between the device electrodes 3102 and 3103. The emitted electrons are attracted to an accelerating voltage (not shown), provided opposing to the electron source, and collide against the fluorescent member (not shown), thus excite the fluorescent member to emit light. In this embodiment, column-direction wiring electrodes 3106 are formed by forming a groove in the substrate (both not shown), applying silver paste to the groove using a fradecoater, and sintering the silver paste. Next, an insulating layer (not shown) is formed on the entire substrate, then the device electrodes 3102 and 3103 and the electron-emitting portion 3101, and a concave portion (not shown) is formed at the row-direction wiring electrodes 3104, 3105 by screen-printing similar to that used in the fourth embodiment. Thereafter, the image forming apparatus is manufactured in accordance with manufacturing process similar to that of the fourth embodiment. In the seventh embodiment, the printing step is also divided into three printing operations such that the thickness of the column-direction wiring electrodes is 50 μm; that of the row-direction wiring electrodes, 60 μm including the depth of the concave portion, 20 μm. Similar to the fourth embodiment, when the image forming apparatus is driven, a two-dimensional array of emitted-light spots at equal intervals is formed. Thus, this embodiment also provides an image forming apparatus that emits light at high efficiency without shift of electron beams to an adjacent pixel position.

The present invention is applicable to any of cold cathode electron-emitting device other than the surface-conduction emission type electron-emitting device. For example, the present applicant has disclosed in Japanese Patent Application Laid-Open No. 63-274047, electron-emitting devices, each having a pair of electrodes opposing to each other, are arranged on a substrate.

Further, the present invention is applicable to any image forming apparatuses which use electron sources other than the electron source with a simple-matrix arrangement of electron-emitting devices. For example, in an image forming apparatus which selects surface-conduction emission type electron-emitting devices by using control electrodes, as disclosed in Japanese Patent Application Laid-Open No. 2-257551 by the present applicant, the above-described support members may be employed.

Further, according to the present invention, the above-described image forming apparatus is not limited to a display device, but it can be used in an optical printer, usually comprising an electrostatic drum, an LED and the like, as a line light-emitting source substituting for the LED. In this case, by selecting the m row-direction wiring electrodes and n column-direction wiring electrodes appropriately, the apparatus can be used as a two-dimensional light-emitting source as well as the line light-emitting source.

Furthermore, according to the present invention, the present image forming apparatus can be applied to a device such as an electron microscope where an object that receives electron beams emitted from an electron source is foreign material. Accordingly, the present invention can be applied to an electron-beam generating apparatus which does not specifies an electron-receiving member.

As described above, in the electron-beam generating apparatus and image forming apparatus of the present invention, support members (spacers) each having a semiconductive film on its surface are provided on some row-direction wiring electrodes, and conductive connection members are arranged for holding the support members and for electrical connection between the semiconductive film of the support members and the wiring electrodes. The existence of the support members does not cause disturbance of the trajectories of electrons emitted from electron-emitting devices of the electron source, since the conductive connection members are arranged such that the height of the row-direction wiring electrode where the support member is provided is the same as that of the row-direction wiring electrode where the support member is not provided. This prevents shift of electron-collision position on a fluorescent member from a position to emit light, to an adjacent pixel position, and prevents luminance degradation, thus enables vivid image display.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

What is claimed is:

1. An electron-beam generating apparatus comprising:
    a plurality of electron emitting devices each having an electron emitting portion;
    first and second conductive members, at least one of said electron emitting devices being disposed between said first and second conductive members;
    an accelerating electrode opposite to said electron emitting devices;
    a support member arranged between said accelerating electrode and said first conductive member, and located on said first conductive member, wherein the resistance of said support member along a direction from said first conductive member to said accelerating electrode is greater than 10,000 times the resistance of said first conductive member in said direction,
    wherein the inclination of an equipotential surface in the vicinity of said first conductive member is opposite to the inclination of an equipotential surface in the vicinity of said second conductive member.

2. The apparatus according to claim 1, wherein an upper surface of said first conductive member and an upper surface of said second conductive member differ in height by less than 5 $\mu$m.

3. An image forming apparatus comprising:
    a plurality of electron emitting devices each having an electron emitting portion;
    first and second conductive members, at least one of said electron emitting devices being disposed between said first and second conductive members;
    an accelerating electrode opposite to said electron emitting devices;
    an image forming member opposite to said electron emitting devices;
    a support member arranged between said accelerating electrode and the conductive member, wherein resistance in the height direction of the support member is greater than 10,000 times the resistance in the height direction of the conductive member, and the support member is provided on the conductive member,
    wherein, the inclination of an equipotential surface in the space in the vicinity of a first portion of the conductive member to which said support member is provided is opposite to the inclination of an equipotential surface in the space in the vicinity of a second portion of the conductive member, to which said support member is not provided, where said second portion is opposite to said first portion via an electron emitting device.

* * * * *

UNITED STATES PATENT AND TRADEMARK OFFICE
CERTIFICATE OF CORRECTION

| | |
|---|---|
| PATENT NO. | : 6,140,761 |
| APPLICATION NO. | : 09/253097 |
| DATED | : October 31, 2000 |
| INVENTOR(S) | : Masahiro Fushimi et al. |

It is certified that error appears in the above-identified patent and that said Letters Patent is hereby corrected as shown below:

COVER PAGE (56) Foreign Patent Documents

"2257551" should read --2-257551--;

COVER PAGE - INSERT:

--(30) Foreign Application Priority Data

Feb. 3, 1995 [JP] Japan   7-016780
Mar. 14, 1995 [JP] Japan  7-054133
Jan. 23, 1996 [JP] Japan  8-009555--

COVER PAGE (57) Abstract

Line 6, "includes" should read --include--.

COLUMN 1

Line 13, "applied to and," should read --applied, and--;
Line 29, "obtain" should read --obtain an--;
Line 30, "cathode" should read --cathode type of--;
Line 36, "or" should read --and--;
Line 41, "properties of thin-film field" should read --Properties of Thin-Film Field--;
Line 42, "emission cathodes with molybdenum cones" should read --Emission Cathodes with Molybdenum Cones--;
Line 52, "where" should read --in which--;
Line 54, "the" ($2^{nd}$ occurrence) should read --such--;
Line 56, "SnO2" should read --$SnO_2$--;
Line 58, "solid" should read --Solid--; and "In2O3/SnO2" should read --$In_2O_3/SnO_2$--; and
Line 63, "abovementioned" should read --above-mentioned--.

UNITED STATES PATENT AND TRADEMARK OFFICE
CERTIFICATE OF CORRECTION

| | |
|---|---|
| PATENT NO. | : 6,140,761 |
| APPLICATION NO. | : 09/253097 |
| DATED | : October 31, 2000 |
| INVENTOR(S) | : Masahiro Fushimi et al. |

It is certified that error appears in the above-identified patent and that said Letters Patent is hereby corrected as shown below:

COLUMN 2

Line 13, "the-destroyed" should read --the destroyed--;
Line 23, "the" ($1^{st}$ occurrence) should read --an--;
Line 34, "(e.g.," should read --(e.g., commonly assigned--; and "by the present applicant" should be deleted;
Line 35, "a" should be deleted;
Line 36, "voluntary" should read --controllable--;
Line 40, "Japanese" should read --commonly assigned Japanese--; and "NO. 2-257551 by" should read --No. 2-257551,--;
Line 41, "the present applicant," should be deleted;
Line 52, "for" should read --for the--;
Line 55, "of display" should read --of the displayed--;
Line 61, "has" should read --have--; and
Line 66, "change" should read --and change--.

COLUMN 3

Line 6, "change" should read --and change--;
Line 19, "a" should read --the--;
Line 21, "a" should read --the--;
Line 25, "the" should read --that--;
Line 26, "wherein" should be deleted;
Line 28, "and wherein" should be deleted;
Line 29, "further wherein" should be deleted;
Line 35, "the" should read --that--;
Line 36, "wherein" should be deleted;
Line 38, "wherein a" should read --the--;
Line 42, "the" should read --that--;
Line 43, "wherein a" should read --the--;
Line 45, "a" should read --the--;
Line 47, "wherein a" should read --the--;
Line 49, "a" should read --the--;
Line 58, "a" should be deleted; and
Line 67, "a" should read --the--.

UNITED STATES PATENT AND TRADEMARK OFFICE
CERTIFICATE OF CORRECTION

PATENT NO. : 6,140,761
APPLICATION NO. : 09/253097
DATED : October 31, 2000
INVENTOR(S) : Masahiro Fushimi et al.

It is certified that error appears in the above-identified patent and that said Letters Patent is hereby corrected as shown below:

COLUMN 4

Line 2, "a" should read --the--;
Line 14, "flows the" should read --flows in the--;
Line 27, "are" should read --is--; and "of" should read --or gradient in the--;
Line 36, "preferable" should read --suitable for use--;
Line 41, "be" should read --be either a--;
Line 42, "as well as" should read --or--;
Line 44, "according to the present invention," should be deleted;
Line 45, "the" should be deleted;
Line 46, "the" should be deleted;
Line 48, "an" should read --other--;
Line 53, "name" should be deleted;
Line 65, "view" should read --view taken from line 2-2 in FIG. 1,--; and
Line 66, "the" ($2^{nd}$ occurrence) should read --that--.

COLUMN 5

Line 3, "cut out along a" should read --taken from--;
Line 21, "view" should read --views--;
Line 22, "the" should read --this--;
Line 29, "low" should read --row--;
Line 47, "source,;" should read --source;--; and
Line 63, "is" should read --are--.

COLUMN 6

Line 13, "and" should be deleted;
Line 16, "embodiment." should read --embodiment; and FIG. 31A is a detail of a portion of FIG. 31.--; and
Line 56, "asymmetric" should read --that the asymmetric--.

UNITED STATES PATENT AND TRADEMARK OFFICE
CERTIFICATE OF CORRECTION

PATENT NO.       : 6,140,761
APPLICATION NO.  : 09/253097
DATED            : October 31, 2000
INVENTOR(S)      : Masahiro Fushimi et al.

It is certified that error appears in the above-identified patent and that said Letters Patent is hereby corrected as shown below:

COLUMN 7

Line 45, "thus" should read --and thus--;
Line 48, "a" should be deleted; and "member" should read --members--;
Line 49, "the" should read --as the--;
Line 53, "due to" should read --by--;
Line 54, "regularity of" should read --required degree of regularity of the--; and
Line 59, "prevented," should read --prevented--.

COLUMN 8

Line 6, "equipotent line 60 has" should read --equipotential line 60 has a--;
Line 7, "side" should read --sides--;
Line 10, "(toward" should read --(toward the--;
Line 16, "with" should be deleted;
Line 20, "equipotent" should read --equipotential--;
Line 23, "equipotent" should read --equipotential--;
Line 27, "electrodes" should read --electrode--;
Line 29, "mounted" should read --mounted on--;
Line 32, "it is" should read --will be--;
Line 39, "thus" should read --and thus--; and
Line 46, "symmetri." should read --symmetric.--.

COLUMN 9

Line 4, "(flit" should read --(frit--;
Line 6, "flit" should read --frit--;
Line 8, "flit" should read --frit--;
Line 9, "flit" should read --frit--;
Line 11, "flit" should read --frit--;
Line 14, "flit-glass" should read --frit-glass--;
Line 15, "flit-glass" should read --frit-glass--;
Line 17, "of" should read --for--;
Line 22, "flit-glass" should read --frit-glass--;
Line 23, "flit-glass" should read --frit-glass--;
Line 27, "flit" should read --frit--;

UNITED STATES PATENT AND TRADEMARK OFFICE
CERTIFICATE OF CORRECTION

| | |
|---|---|
| PATENT NO. | : 6,140,761 |
| APPLICATION NO. | : 09/253097 |
| DATED | : October 31, 2000 |
| INVENTOR(S) | : Masahiro Fushimi et al. |

It is certified that error appears in the above-identified patent and that said Letters Patent is hereby corrected as shown below:

Line 35, "flit-glass" should read --frit-glass--;
       Line 36, "flit-glass" should read --frit-glass--;
       Line 38, "Flit-Glass" should read --Frit-Glass--;
       Line 41, "flit glass" should read --frit-glass--;
       Line 42, "flit-glass" should read --frit-glass--;
       Line 45, "flit-glass" should read --frit-glass--;
       Line 47, "flit-glass" should read --frit-glass--;
       Line 50, "An" should read --A--;
       Line 51, "flit-glass" should read --frit-glass--;
       Line 56, "flit-glass" should read --frit-glass--;
       Line 60, "flit-glass" should read --frit-glass--;
       Line 62, "flit-glass" should read --frit-glass--;
       Line 64, "flit-" should read --frit- --; and
       Line 66, "thus fixing is completed." should read --thus completing the fixing process.--.

COLUMN 10

Line 2, "can" should be deleted;
       Line 9, "less of magnitude," should read --of magnitude less,--; and "less of" should be deleted;
       Line 10, "magnitude" should read --of magnitude less--;
       Line 18, "field," should read --field;--;
       Line 20, "effects" should read --affects--;
       Line 42, "multi electron" should read --multi-electron--;
       Line 54, "of" should read --of available--;
       Line 58, "thus" should read --and thus--;
       Line 59, "Recent situation" should read --In recent situations--; and
       Line 66, "where" should read --in which--.

COLUMN 11

Line 3, "following" should read --following,--;
       Line 4, "multi" should read --multi- --;
       Line 12, "name is made" should read --term is adopted--;

UNITED STATES PATENT AND TRADEMARK OFFICE
CERTIFICATE OF CORRECTION

| | |
|---|---|
| PATENT NO. | : 6,140,761 |
| APPLICATION NO. | : 09/253097 |
| DATED | : October 31, 2000 |
| INVENTOR(S) | : Masahiro Fushimi et al. |

It is certified that error appears in the above-identified patent and that said Letters Patent is hereby corrected as shown below:

Line 13, "it" should read --the invention--; and "replaced with" should read --implemented at or along--;
      Line 14, "the" should be deleted;
      Line 15, "point" should read --standpoint of obtaining the benefits--;
      Line 20, "A-A'." should read --2-2.--;
      Line 21, "1 where" should read --1, in which--;
      Line 32, "flit-glass" should read --frit-glass--;
      Line 40, "an" should read --a--; and
      Line 54, "cut" should read --is cut--.

COLUMN 12

Line 10, "device" should read --device(s)--; and "11," should read --11, and--;
      Line 11, "status" should read --status,--;
      Line 31, "and" should read --and are--; and
      Line 33, "all" should read --all of--.

COLUMN 13

Line 16, "mask," should read --mask and,--;
      Line 17, "made" should read --performed--;
      Line 18, "CF4 and H2" should read --$CF_4$ and $H_2$--;
      Line 35, "covers each" should read --covering a--;
      Line 38, "then" should read --and then--; and "process" should be deleted;
      Line 39, "made" should read --preferred--;
      Line 40, "a fine-particles" should read --fine particles--;
      Line 41, "main" should read --a main--; and "manner" should read --manner,--;
      Line 44, "is" should read --thereof includes--; and
      Line 46, "or" should read --or where--.

COLUMN 14

Line 19, "1103, thus" should read --1103; thus,--;
      Line 23, "otherwise" should read --or otherwise--; and
      Line 66, "conditions)," should read --condition(s),--.

UNITED STATES PATENT AND TRADEMARK OFFICE
CERTIFICATE OF CORRECTION

PATENT NO.       : 6,140,761
APPLICATION NO.  : 09/253097
DATED            : October 31, 2000
INVENTOR(S)      : Masahiro Fushimi et al.

It is certified that error appears in the above-identified patent and that said Letters Patent is hereby corrected as shown below:

COLUMN 15

Line 1, "(In" should read --(in--;
Line 5, "become," should read --become--;
Line 6, "100 times or greater." should read --100 more times greater.--;
Line 39, "thus" should read --and thus--;
Line 46, "elapse" should read --the elapse--;
Line 49, "then" should read --and then--; and
Line 53, "In case" should read --In the case--.

COLUMN 17

Line 20, "damaging" should read --damage--;
Line 48, "condition" should read --conditions--;
Line 49, "processing" should be deleted; and
Line 54, "$10^{-6}$ or $10^{-7}$" should read --$10^{-6}$ torr or $10^{-7}$ torr--.

COLUMN 18

Line 12, "a," should read --a--;
Line 20, "nb," should read --Nb,--; and
Line 21, "otherwise," should read --or otherwise--.

COLUMN 19

Line 8, "transverse" should read --traverse--;
Line 23, "flit-glass" should read --frit-glass--;
Line 31, "flit-glass" should read --frit-glass--;
Line 32, "flit-glass" should read --frit-glass--;
Line 39, "flit-glass" should read --frit-glass--; and
Line 40, "flit-glass" should read --frit-glass--.

UNITED STATES PATENT AND TRADEMARK OFFICE
CERTIFICATE OF CORRECTION

PATENT NO.       : 6,140,761
APPLICATION NO.  : 09/253097
DATED            : October 31, 2000
INVENTOR(S)      : Masahiro Fushimi et al.

It is certified that error appears in the above-identified patent and that said Letters Patent is hereby corrected as shown below:

COLUMN 21

Line 58, "outputs" should read --output--;
      Line 59, "other electron-emitting devices" should read --electron-emitting devices other--; and
      Line 60, "voltage" should read --a voltage--.

COLUMN 22

Line 2, "line-sequentially" should read --line-sequential--;
      Line 27, "storing etc." should read --storing, etc.,--; and
      Line 30, "image" should read --the image--.

COLUMN 24

Line 36, "informations," should read --information,--; and
      Line 59, "Contrary," should read --On the contrary,--.

COLUMN 27

Line 34, "electrodes" should read --electrodes that--;
      Line 41, "flit-glass" should read --frit-glass--;
      Line 49, "flit-glass" should read --frit-glass--;
      Line 50, "flit-glass" should read --frit-glass--; and
      Line 52, "while" should be deleted.

COLUMN 28

Line 35, "simultaneously," should read --simultaneously;--;
      Line 36, "deformation of the paste" should read --considerable deformation of the paste, when paste is used--;
      Line 37, "by a" should be deleted;
      Line 38, "considerably-great amount" should be deleted;
      Line 41, "a" ($2^{nd}$ occurrence) should read --the--;
      Line 48, "may" should read --might--;
      Line 51, "electrodes," should read --electrodes;--; and
      Line 58, "trodes" should read --trodes,--.

UNITED STATES PATENT AND TRADEMARK OFFICE
CERTIFICATE OF CORRECTION

PATENT NO. : 6,140,761  
APPLICATION NO. : 09/253097  
DATED : October 31, 2000  
INVENTOR(S) : Masahiro Fushimi et al.

It is certified that error appears in the above-identified patent and that said Letters Patent is hereby corrected as shown below:

COLUMN 30

Line 32, "against" should read --with--;  
Line 33, "thus" should read --and thus--;  
Line 35, "(both not" should read --(neither of which is--;  
Line 49, "60 µm including" should read --60 µm, or taking account of--;  
Line 59, "present applicant has disclosed" should read --assignee of the present invention has disclosed,--; and  
Line 61, "opposing" should read --opposed--; and "are" should read --and--.

COLUMN 31

Line 3, "present applicant," should read --assignee of the present invention,--;  
Line 7, "it" should be deleted;  
Line 21, "specifies" should read --specify--; and  
Line 39, "enables" should read --enabling--.

Signed and Sealed this

Twenty-sixth Day of February, 2008

JON W. DUDAS  
*Director of the United States Patent and Trademark Office*